(12) United States Patent
Horiuchi et al.

(10) Patent No.: US 12,432,024 B2
(45) Date of Patent: *Sep. 30, 2025

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Ankit Bhamri, Rödermark (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,444

(22) Filed: May 2, 2024

(65) Prior Publication Data

US 2024/0283591 A1    Aug. 22, 2024

Related U.S. Application Data

(63) Continuation of application No. 17/601,012, filed as application No. PCT/JP2019/015209 on Apr. 5, 2019, now Pat. No. 12,010,051.

(51) Int. Cl.
| | | |
|---|---|---|
| *H04L 5/00* | (2006.01) | |
| *H04L 1/00* | (2006.01) | |
| *H04W 24/08* | (2009.01) | |
| *H04W 72/044* | (2023.01) | |
| *H04W 72/23* | (2023.01) | |

(52) U.S. Cl.
CPC .......... *H04L 5/0044* (2013.01); *H04L 1/0008* (2013.01); *H04W 24/08* (2013.01); *H04W 72/044* (2013.01); *H04W 72/23* (2023.01)

(58) Field of Classification Search
CPC .... H04L 5/0044; H04L 1/0008; H04W 72/23; H04W 24/08; H04W 72/044
USPC .......................................................... 370/329
See application file for complete search history.

(56) References Cited

U.S. PATENT DOCUMENTS

| 12,010,051 | B2 * | 6/2024 | Horiuchi ............... H04L 5/0053 |
|---|---|---|---|
| 2018/0332566 | A1 | 11/2018 | You et al. |
| 2019/0313378 | A1 | 10/2019 | Abdoli et al. |
| 2020/0304230 | A1 | 9/2020 | Papasakellariou |
| 2020/0404669 | A1 * | 12/2020 | Seo ....................... H04L 25/0238 |
| 2022/0124788 | A1 | 4/2022 | Kittichokechai et al. |
| 2022/0167320 | A1 * | 5/2022 | Lee ........................ H04L 1/1671 |

OTHER PUBLICATIONS

LG Electronics, "Discussion on resource allocation for NR sidelink Mode 1," R1-1905438, Agenda Item; 7.2.4.2.1, 3GPP TSG RAN WG1 #96bis, Xi'an, China, Apr. 8-12, 2019, 5 pages.

(Continued)

*Primary Examiner* — Christopher R Crompton
(74) *Attorney, Agent, or Firm* — Seed Intellectual Property Law Group LLP

(57) ABSTRACT

A first process (Step 4) of equalizing the sizes of control information between a first format for a first search space and a second format for a second search space and a second process (Procedure B) of equalizing the sizes of control information between a third format and the first format or the second format are carried out in a stepwise manner.

15 Claims, 11 Drawing Sheets

(56) References Cited

OTHER PUBLICATIONS

3GPP TS 38.213 V15.5.0, "3rd Generation Partnership Project; Technical Specification Group Radio Access Network; NR; Physical layer procedures for control (Release 15)" Mar. 2019, 104 pages.
Ericsson, "PDCCH Enhancements for NR URLLC," R1-1904122, Agenda Item: 7.2.6.1, 3GPP TSG-RAN WG1 #96bis, Xi'an, China, Apr. 8-12, 2019, pp. 1-10.
Ericsson, "Summary of 7.1.3.1.4 (DCI contents and formats)," R1-1803232, Agenda Item: 7.1.3.1.4, TSG-RAN WG1 #92, Athens, Greece, Feb. 26-Mar. 2, 2018. (19 pages).
Extended European Search Report, dated May 13, 2022, for European Patent Application No. 19922911.3-1213. (10 pages).
Huawei, HiSilicon, "Remaining issues on DCI contents and formats," R1-1803707, Agenda Item: 7.1.3.1.4, 3GPP TSG RAN WG1 Meeting #92bis, Sanya, China, Apr. 16-20, 2018. (9 pages).
Huawei, "Summary of 7.2.6.1.1 Potential enhancements to PDCCH," R1-1903349, Agenda Item: 7.2.6.1.1, 3GPP TSG RAN WG1 Meeting #96, Athens, Greece, Feb. 25-Mar. 1, 2019, pp. 1-37.
Huawei, "Combined CR of all essential corrections to 38.212 from RAN1#94bis and RAN1#95," R1-1814400, 3GPP TSG RAN WG1 Meeting #95, Spokane, USA, Nov. 12-16, 2018. (49 pages).
Office action, dispatched Apr. 18, 2023, for Indian Patent Application No. 202127044843. (6 pages).
International Search Report, dated Jun. 25, 2019, for International Application No. PCT/JP2019/015209, 3 pages. (with English Translation).
Panasonic, "PDCCH enhancements for NR URLLC," R1-1902399, Agenda Item: 7.2.6.1.1, 3GPP TSG RAN WG1 #96, Athens, Greece, Feb. 25-Mar. 1, 2019, pp. 1-9.
Wilus Inc., "On DCI enhancement for NR URLLC," R1-1905430, Agenda Item: 7.2.6.1, 3GPP TSG RAN WG1 #96bis, Xi'an, China, Apr. 8-12, 2019, pp. 1-3.

* cited by examiner

BASE STATION, TERMINAL, AND COMMUNICATION METHOD

TECHNICAL FIELD

The present disclosure relates to a base station, a terminal, and a communication method.

BACKGROUND ART

A communication system called 5th generation mobile communication system (5G) is being considered. For example, it is considered to flexibly offer functions for individual use cases where an increase in communication traffic, an increase in the number of connected terminals, high reliability, and low latency are required.

Examples of a representative service include the following three services: enhanced Mobile Broadband (eMBB), massive Machine Type Communications (mMTC), and Ultra Reliable and Low Latency Communication (URLLC).

In the Third Generation Partnership Project (3GPP), which is an international standard-setting organization, sophistication of a communication system is being considered from perspective of sophistication of a Long Term Evolution (LTE) system and a New Radio (NR).

CITATION LIST

Non-Patent Literature

NPL 1
R1-1903349 "Summary of 7.2.6.1.1 Potential enhancements to PDCCH," Huawei, 3GPP TSG RAN WG1 Meeting #96, Feb. 25-Mar. 1, 2019.
NPL 2
3GPP TS38.213 V15.5.0 (2019-03)

SUMMARY OF INVENTION

There is room for discussing adjustment of a size of control information for which plural kinds of formats are defined for the purpose of allowing a terminal to properly detect control information transmitted from a base station.

Non-limiting embodiments of the present disclosure facilitate providing an improved base station, terminal, and communication method that allow a terminal to properly detect control information.

A base station according to one aspect of the present disclosure includes: control circuitry, which, in operation, performs first processing for size alignment of control information between a first format for a first search space and a second format for a second search space and second processing for size alignment of the control information between a third format and the first format or the second format in a stepwise manner; and transmission circuitry, which, in operation, transmits the control information.

A terminal according to one aspect of the present disclosure includes: control circuitry, which, in operation, controls reception of control information based on information concerning application of first processing for size alignment of the control information between a first format and a second format and second processing for size alignment of the control information between a third format and the first format or the second format; and reception circuitry, which, in operation, receives the control information in accordance with the control.

A communication method for a base station, according to one aspect of the present disclosure, includes: performing first processing for size alignment of control information between a first format for a first search space and a second format for a second search space and second processing for size alignment of the control information between a third format and the first format or the second format in a stepwise manner; and transmitting the control information.

A communication method for a terminal, according to one aspect of the present disclosure includes: controlling reception of control information based on information concerning application of first processing for size alignment of the control information between a first format for a first search space and a second format for a second search space and second processing for size alignment of the control information between a third format and the first format or the second format; and receiving the control information in accordance with the control.

It should be noted that general or specific embodiments may be implemented as a system, an apparatus, a method, an integrated circuit, a computer program, a storage medium, or any selective combination thereof.

According to an aspect of the present disclosure, a terminal can properly detect control information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
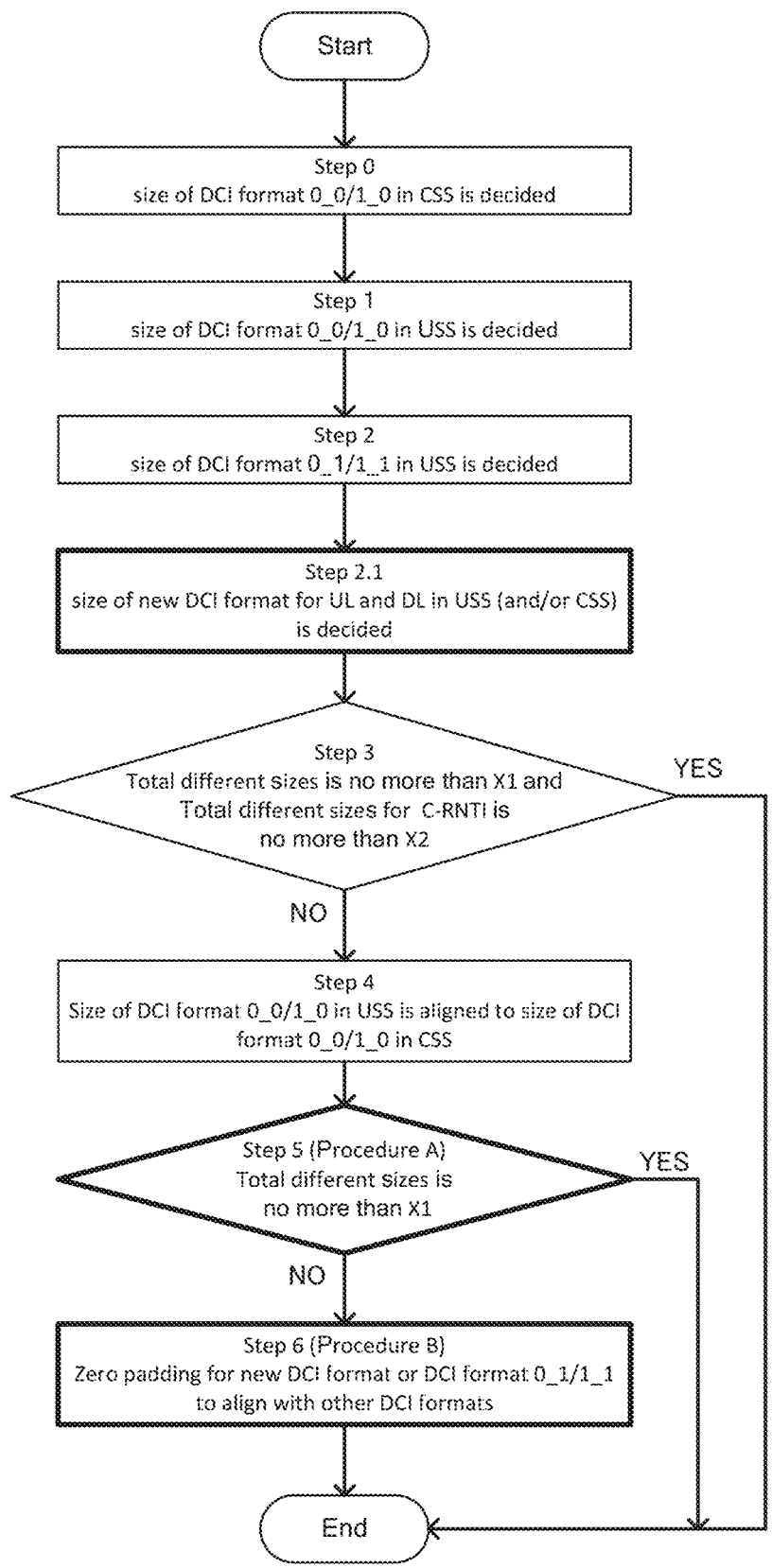
FIG. 1 is a flowchart illustrating Operation Example 1-1 according to Embodiment 1.

Embodiments of the present invention will be described in detail with reference to the drawings. Note, however, that description detailed more than necessary is sometimes omitted. For example, detailed description of a well-known matter and repeated description of a substantially identical configuration are sometimes omitted. This is to avoid unnecessary redundancy of the following description and promote understanding of a person skilled in the art.

Note that the accompanying drawings and the following description are provided to make a person skilled in the art fully understand the present disclosure and do not intend to restrict the subject matters recited in the claims.

In the NR, a control resource set (CORESET) and a search space are configured for a terminal (e.g., user equipment (UE)) as a PDCCH region, which is one of control channels for transmitting downlink control information (DCI). The UE monitors the search space, which is a position of a physical downlink control channel (PDCCH) candidate in the CORESET and detects DCI. The following eight kinds are prepared as DCI formats (see, for example, NPL 2).

DCI format 0_0 for the scheduling PUSCH
DCI format 0_1 for the scheduling PUSCH
DCI format 1_0 for the scheduling PDSCH
DCI format 1_1 for the scheduling PDSCH
DCI format 2_0 for notifying slot format
DCI format 2_1 for preemption
DCI format 2_2 for TPC commands for PUCCH and PUSCH
DCI format 2_2 for a group of TPC commands for SRS Note that "PUSCH" is an abbreviation for "physical uplink shared channel," and "PDSCH" is an abbreviation for "physical downlink shared channel." Furthermore, "TPC" is an abbreviation for "transmission power control," and "SRS" is an abbreviation for "sounding reference signal." In the following description, "/" in expressions such as "DCI format 0_0/1_0" and "DCI format 0_1/1_1" means "and/or."

A size of a DCI format 0_0/1_0 may differ between a common search space (CSS) and a UE specific search space (USS). It is stipulated that a DCI format 2_2 and a DCI format 2_2 have the same size as the DCI format 0_0/1_0 in the CSS. Note that one of the CSS and the USS may correspond to an example of a first search space, and the other one of the CSS and the USS may correspond to an example of a second search space.

UE monitors a DCI format that is configured to be monitored by a base station (e.g., gNB). The base station can cause different UEs to monitor different DCI formats. In NPL 2, it is stipulated that UE need not monitor more than four DCI formats of different sizes. Furthermore, UE need not monitor more than three DCI formats of different sizes as for DCI formats masked (in other words, scrambled) by a cell-radio network temporary identifier (C-RNTI). The base station configures DCI formats according to these stipulations.

In URLLC, ultra reliability and low latency are required, and therefore a decrease in error rate of a PDSCH, which is an example of a downlink (DL) data channel, is required. To decrease an error rate of the data channel, it is required to decrease an error rate of a PDCCH, which is an example of a control channel. Since UE can correctly recognize assignment of the PDSCH if the UE can correctly detect the PDCCH, an error rate of the PDSCH can be decreased.

As an example of a method for decreasing the error rate of the PDCCH, it is considered to reduce a size of DCI transmitted in the PDCCH by approximately 10 to 16 bits as compared with the DCI format 0_0/1_0 (see, for example, NPL 1). Furthermore, it is also considered to make a field included in DCI variable by configuration of a higher layer and make the size of the DCI larger than the DCI format 0_0/1_0.

In a case where the base station configures a DCI format of a size different from an existing (or a legacy) DCI format, the number of trials to detect DCI by UE, in other words, the number of times of blind detection (BD) can increase.

In the embodiments below, an example in which proper DCI detection by UE is realized in a case where a base station configures a DCI format of a size different from an existing DCI format is described.

Embodiment 1

In Embodiment 1, sizes of DCI formats are adjusted in a stepwise manner. For example, in first-stage processing, sizes of the DCI format 0_0/1_0 in the CSS and the DCI format 0_0/1_0 in the USS are made identical to each other. In second-stage processing, sizes of a DCI format (hereinafter referred to as a "new DCI format" for convenience) considered to be extended for URLLC and other DCI format(s) are made identical to each other. Note that processing for making sizes of DCI formats identical to each other may be grasped as making the sizes of the DCI formats match each other, making the sizes of the DCI formats equal to each other, or aligning the sizes of the DCI formats.

According to the second-stage processing, in a case where the total number of different DCI format sizes is smaller than a standard in the first-stage processing, the second-stage processing can be skipped (or bypassed). Since the second-stage processing can be skipped, a size of DCI can be held or kept at a size suitable for operation.

Therefore, for example, the error rate of the PDCCH can be decreased. Since the error rate of the PDCCH can be decreased, the error rate of the PDSCH can be decreased. This can improve reception quality of the PDCCH and the PDSCH at UE, thereby improving throughput of DL.

Example of Method for Deciding Size of DCI format in Case Where New DCI Format Is Not Considered In the DCI format 0_0/1_0, the number of bits used for frequency domain resource assignment can vary depending on an assumed value of a band width (e.g., band width part (BWP)). Accordingly, the size of the DCI format 0_0/1_0 is decided according to the value of the BWP. Furthermore, in the DCI format 0_1/1_1, a field in which the number of bits is variable by higher layer signaling exists in addition to the frequency domain resource assignment bits. Accordingly, the size of the DCI format can also vary depending on the higher layer signaling.

Figure 12:
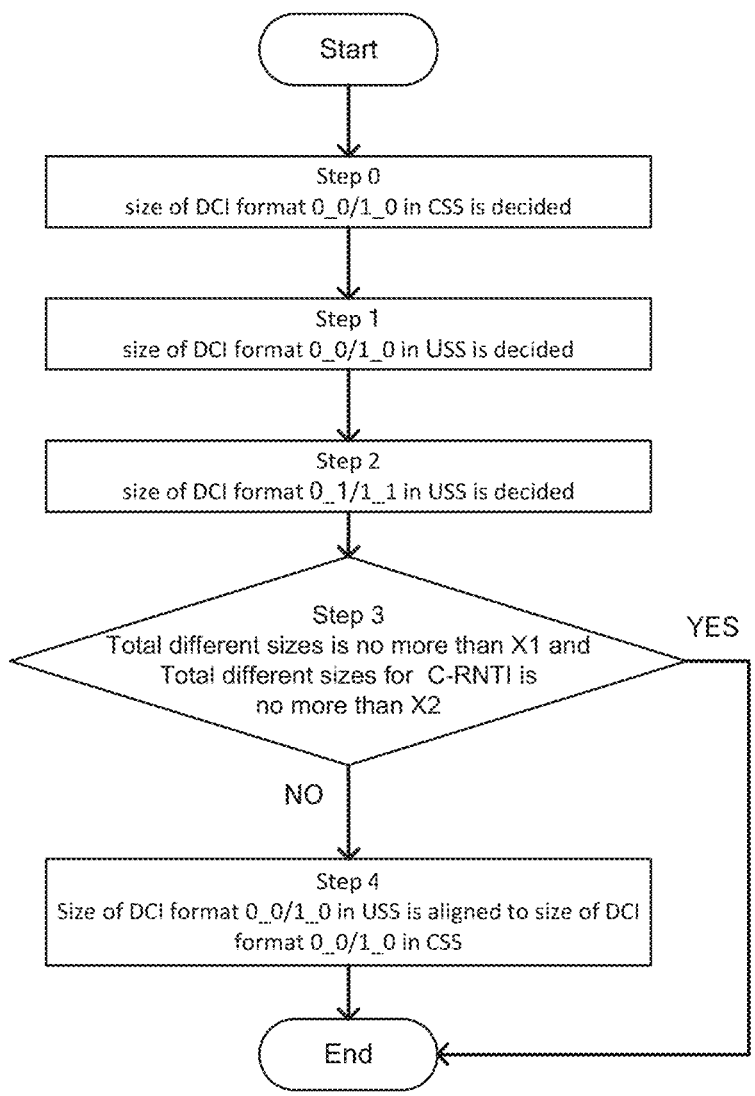
FIG. 12 is a flowchart illustrating an example of a method for deciding a size of a Downlink control information (DCI) format.

In a case where a new DCI format is not considered, a method illustrated in the flowchart of FIG. 12 is considered as an example of a method for deciding a size of a DCI format. In FIG. 12, five steps (Steps 0 to 4) are illustrated.

In Step 0, sizes of the DCI format 0_0 and DCI format 1_0 in the CSS are decided.

For example, the size of the DCI format 0_0 is decided based on a value of an initial UL Band width part (BWP). Note that "UL" is an abbreviation for "uplink."

Meanwhile, the size of the DCI format 1_0 is decided based on a value of a band width of CORESET #0 or a value of an initial DL BWP. In a case where the size of the DCI format 0_0 and the size of the DCI format 1_0 are different from each other, for example, the size of the DCI format 0_0 is adjusted to match (or aligned with) the size of the DCI format 1_0.

For example, in a case where the size of the DCI format 0_0 is smaller than the size of the DCI format 1_0, a bit 0 is added to the DCI format 0_0. In a case where the size of the DCI format 0_0 is larger than the size of the DCI format 1_0, a bit among the frequency domain resource assignment bits is deleted in the DCI format 0_0.

Note that "adding" a bit 0 is interchangeable with other words such as "padding," "inserting," and "prepending." "Deleting" a bit is interchangeable with other words such as "truncating" and "dropping."

In Step 1, sizes of the DCI format 0_0 and the DCI format 1_0 in the USS are decided.

For example, the size of the DCI format 0_0 is decided based on a value of an active UL BWP. The size of the DCI format 1_0 is decided based on a value of an active DL BWP. In a case where the size of the DCI format 0_0 and the size of the DCI format 1_0 are different from each other, a bit 0 is added to one of these DCI formats that has a smaller size so that the size of the one DCI format having the smaller size is adjusted to match the size of the other DCI format having the larger size.

In Step 2, sizes of the DCI format 0_1 and the DCI format 1_1 in the USS are decided.

The size of the DCI format 0_1 is decided based on a value of an active UL BWP. Note that the size of the DCI format 0_1 is set to a size different from the size of the DCI format 0_0 in the USS. The size of the DCI format 1_1 is decided based on a value of an active DL BWP. Note that the size of the DCI format 1_1 is set to a size different from the size of the DCI format 1_0 in the USS.

In Step 3, the following two conditions are checked. In a case where both of the two conditions are met, the processing may be finished. In a case where any one of the two conditions is not met, the processing proceeds to Step 4.

(Condition A) the total number of different DCI format sizes is not more than X1.

(Condition B) the total number of different DCI format sizes monitored by using the C-RNTI is not more than X2.

Note that X1 and X2 are integers of 1 or more, and X1=4 and X2=3 in NPL 2.

In Step 4, size adjustment for making the size of the DCI format 0_0/1_0 in the CSS and the size of the DCI format 0_0/1_0 in the USS match each other is performed. For example, the size of the DCI format 0_0/1_0 in the CSS is adjusted to match (aligned with) the size of the DCI format 0_0/1_0 in the USS. A BWP similar to that in the CSS is assumed as a BWP of the DCI format 0_0/1_0 in the USS.

Operation Example 1-1

Next, Operation Example 1-1 according to Embodiment 1 is described with reference to the flowchart of FIG. 1.

As illustrated in FIG. 1, in Operation Example 1-1, for example, Step 2.1 is performed between Step 2 and Step 3 illustrated in FIG. 12. Step 2.1 corresponds to processing for deciding a size of a new DCI format. Furthermore, in Operation Example 1-1, Procedure A (Step 5) and Procedure B (Step 6) are performed after Step 4 illustrated in FIG. 12.

Procedure A (Step 5) corresponds to processing for determining whether or not to align the size of the new DCI format with other DCI format(s). Procedure B (Step 6) corresponds to processing (hereinafter also referred to as "size adjustment processing") for aligning the size of the new DCI format with other DCI format(s) in accordance with a result of determination indicating that "the size is aligned" in Procedure A (Step 5). An example of "other DCI format(s)" will be described later. In Operation Example 1-1, it is assumed that the new DCI format is, for example, masked (scrambled) by an RNTI different from the C-RNTI.

In Step 2.1 of FIG. 1, the size of the new DCI format is decided.

The new DCI format is monitored by a terminal (e.g., UE) that has received a monitoring indication in a higher layer from a base station (e.g., gNB). It is assumed that the new DCI format is monitored in one of or both of the USS and the CSS. In which of the USS and the CSS the new DCI format is monitored by UE may be indicated to the UE, for example, by higher layer signaling.

Furthermore, it can also be assumed that the new DCI format is supported only in one (e.g., USS) of the USS and the CSS. Furthermore, it can also be assumed that the new DCI format supports one of or both of a control signal (e.g., DL assignment) for assignment of DL PDSCH and a control signal (e.g., UL grant) for assignment of UL PUSCH. Accordingly, a case where monitoring of both of the two control signals is indicated to the UE and a case where monitoring of only one of the two control signals is indicated to the UE are assumed. Note that the "control signal" is interchangeable with "control information."

The size of the new DCI format can vary depending on a field configured from a higher layer. For example, the size of the DCI format can vary depending on the number of bits used in the following 20 fields.

<Example of Fields Set in New DCI Format>
(1) Frequency domain resource assignment
(2) Time domain resource assignment
(3) Modulation and coding scheme
(4) HARQ process number
(5) Redundancy version
(6) PUCCH resource indicator
(7) PDSCH-to-HARQ_feedback timing indicator
(8) Downlink assignment index
(9) Antenna port(s)
(10) Transmission configuration indication
(11) Rate matching indicator
(12) SRS request
(13) PRB bundling size indicator
(14) Carrier indicator
(15) CSI request
(16) ZP CSI-RS triggering
(17) Beta offset indicator
(18) SRS resource indicator
(19) Repetition factor
(20) Priority indication Note that "HARQ" is an abbreviation for "hybrid automatic repeat request," and "PRB" is an abbreviation for "physical resource block." "CSI" is an abbreviation for "channel state information," and "ZP CSI-RS" is an abbreviation for "zero power channel state information-reference signal."

Settings in the above fields may be the same or may differ between DL assignment and DL grant. Furthermore, the size can also vary depending on settings of a UL BWP and a DL BWP. In a case where the CSS and the USS are different in BWP, a size of the new DCI format for CSS and a size of the new DCI format for USS can differ from each other.

After Step 2.1, Step 3 is performed. In a case of No in Step 3, Step 4 is performed, and then Step 5 (Procedure A) is performed. In Step 5 (Procedure A), for example, the condition A "the total number of different DCI format sizes is not more than X1" is checked.

In Operation Example 1-1, it is assumed that the new DCI format is masked by an RNTI different from the C-RNTI, and therefore the determination condition B concerning X2 in Step 3 (the total number of different DCI format sizes monitored by using the C-RNTI is not more than X2) need not be included in Step 5 (Procedure A). In a case where the new DCI format is masked by the C-RNTI, the determination condition B concerning X2 in Step 3 may be included in Step 5 (Procedure A).

In a case where it is determined in Step 5 (Procedure A) that the condition A is met (Step 5; YES), the processing of Operation Example 1-1 may be finished. Meanwhile, in a case where it is determined that the condition A is not met (Step 5; NO), the processing proceeds to Step 6 (Procedure B).

In Step 6 (Procedure B), the size of the new DCI format and size(s) of other DCI format(s) are aligned. For example, the size of the new DCI format and size(s) of one or more of DCI format(s) exemplified below are aligned.

DCI format 0_0/1_0 in CSS
DCI format 0_0/1_0 in USS
DCI format 0_1 in USS
DCI format 1_1 in USS In a case where Step 4 has been performed before Procedure B (Step 6), the DCI format 0_0/1_0 in the CSS and the DCI format 0_0/1_0 in the USS are considered to have an identical size.

Aligning the size of the new DCI format and size(s) of other DCI format(s) in Procedure B can also be grasped as aligning the size(s) of the other DCI format(s) with the size of the new DCI format.

As described above, in Operation Example 1-1, the processing (Step 6; Procedure B) for aligning the size of the new DCI format with the size(s) of the other DCI format(s) is performed after the processing (Step 4) for making the size of the DCI format 0_0/1_0 in the CSS and the size of the DCI format 0_0/1_0 in the USS match each other. In other words, the processing for aligning the size of the DCI format 0_0/1_0 in the CSS and the size of the DCI format 0_0/1_0 in the USS is performed before the processing for aligning the size of the new DCI format with the size(s) of the other DCI format(s).

Accordingly, in a case where it is determined in the first determination processing (Step 3) that the total number of DCI formats of different sizes exceeds the specified value X1 (NO), the processing for "aligning the size of the DCI format 0_0/1_0 in the CSS and the size of the DCI format 0_0/1_0 in the USS" in Step 4 is preferentially performed.

Accordingly, in a case where it is determined in the second determination processing (Step 5) that the total number of DCI formats of different sizes is within the specified value X1, Step 6 (Procedure B) is skipped (or bypassed).

Since Step 6 (Procedure B) is skipped, the size of the new DCI format need not be changed (or adjusted). Therefore, for example, in a case where DCI of a smaller size (may be referred to as "Compact DCI" for convenience) than sizes of other DCI formats is configured as the new DCI format for URLLC, the new DCI format can be used while keeping the small size. It is therefore possible to keep reception quality of the new DCI format at UE. In other words, it is possible to suppress or prevent a decrease in reception quality of the new DCI format at UE due to size adjustment of the new DCI format.

Operation Example 1-2

Figure 2:
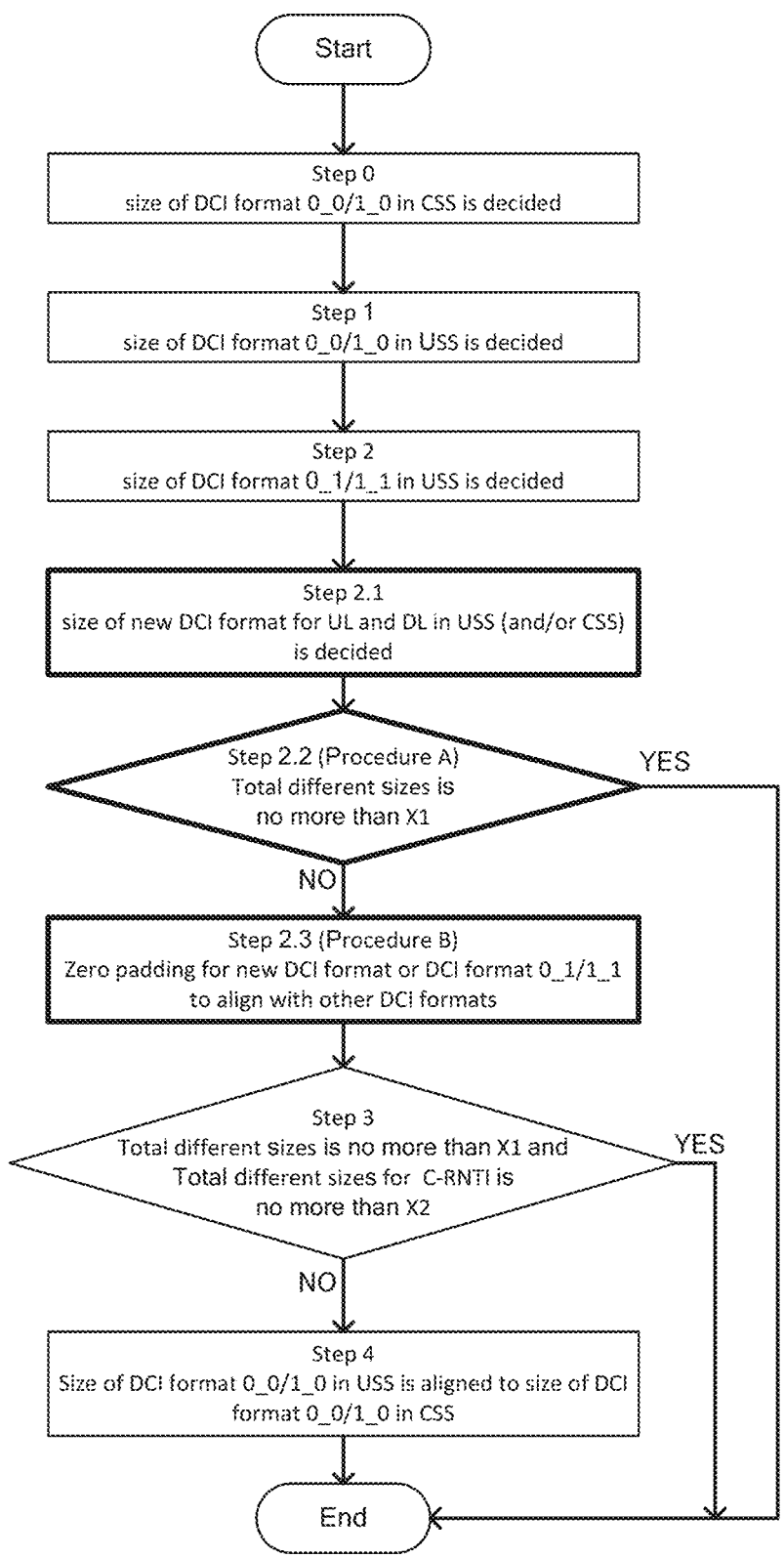
FIG. 2 is a flowchart illustrating Operation Example 1-2 according to Embodiment 1.

Next, Operation Example 1-2 according to Embodiment 1 is described with reference to the flowchart of FIG. 2.

In Operation Example 1-2, determination processing (Step 2.2; Procedure A) and size adjustment processing (Step 2.3; Procedure B) are performed before Step 4 (e.g., between Step 2 and Step 3), unlike Operation Example 1-1.

Step 2.2 (Procedure A) corresponds to processing for determining whether or not to align the size of the new DCI format with other DCI format(s), and Step 2.3 (Procedure B) corresponds to processing for aligning the size of the new DCI format with the other DCI format(s). Note that Step 2.1 in FIG. 2 is similar to Step 2.1 in Operation Example 1-1 of FIG. 1.

In Operation Example 1-2, it is assumed that the new DCI format is masked (scrambled) by an RNTI different from the C-RNTI, as in Operation Example 1-1. The following focuses on the processing (Step 2.2 and Step 2.3) different from Operation Example 1-1.

In Step 2.2 (Procedure A), for example, the condition A "the total number of different DCI format sizes is not more than X1" is checked.

Since it is assumed in Operation Example 1-2 that the new DCI format is masked (scrambled) by an RNTI different from the C-RNTI as in Operation Example 1-1, the determination condition B concerning X2 (the total number of different DCI format sizes monitored by using the C-RNTI is not more than X2) need not be included in Step 2.2 (Procedure A). In a case where the new DCI format is masked by the C-RNTI, the determination condition B concerning X2 may be included in Step 2.2 (Procedure A).

In a case where it is determined in Step 2.2 (Procedure A) that the condition A is met (Step 2.2; YES), the processing of Operation Example 1-2 may be finished. Meanwhile, in a case where it is determined that the condition A is not met (Step 2.2; NO), the processing proceeds to Step 2.3 (Procedure B).

In Step 2.3 (Procedure B), the size of the new DCI format and size(s) of other DCI format(s) are aligned, as in Step 6 of FIG. 1. For example, the size of the new DCI format and size(s) of one or more of DCI format(s) exemplified below are aligned.

DCI format 0_0/1_0 in CSS
DCI format 0_0/1_0 in USS
DCI format 0_1 in USS
DCI format 1_1 in USS In Operation Example 1-2, Step 3 and Step 4 illustrated in FIG. 1 are performed after Step 2.3 (Procedure B).

As described above, in Operation Example 1-2, the processing (Step 2.3; Procedure B) for aligning the size of the new DCI format with the size(s) of other DCI format(s) is performed before Step 4 illustrated in FIG. 1. In other words, the processing for aligning the size of the new DCI format with the size(s) of other DCI format(s) is performed before the processing for aligning the size of the DCI format 0_0/1_0 in the CSS and the size of the DCI format 0_0/1_0 in the USS.

Accordingly, in a case where it is determined in the first determination processing (Step 2.2) that the total number of DCI formats of different sizes exceeds the specified value X1 (NO), the processing for "aligning the size of the new DCI format and size(s) of other DCI format(s)" in Step 2.3 is preferentially performed.

Therefore, in a case where it is determined in Step 2.2 (Procedure A) that the total number of DCI formats of different sizes is within the specified value X1, Step 4 (Procedure B) is skipped (or bypassed).

Since Step 4 is skipped, the size of the DCI format 0_0/1_0 in the CSS and the size of the DCI format 0_0/1_0 in the USS need not be aligned. Therefore, for example, in a case where a BWP of the USS is wider than a BWP of the CSS, a BWP that can be indicated in the DCI format 0_0/1_0 in the USS need not be adjusted to match the BWP of the CSS and can be a BWP specific to the USS. This allows, for example, flexible resource assignment in the DCI format 0_0/1_0 in the USS.

Operation Example 1-3

Next, Operation Example 1-3 according to Embodiment 1 is described with reference to the flowchart of FIG. 3. Operation Example 1-3 can be grasped as corresponding to a modification combining the elements of Operation Example 1-1 and Operation Example 1-2 described above.

Figure 3:
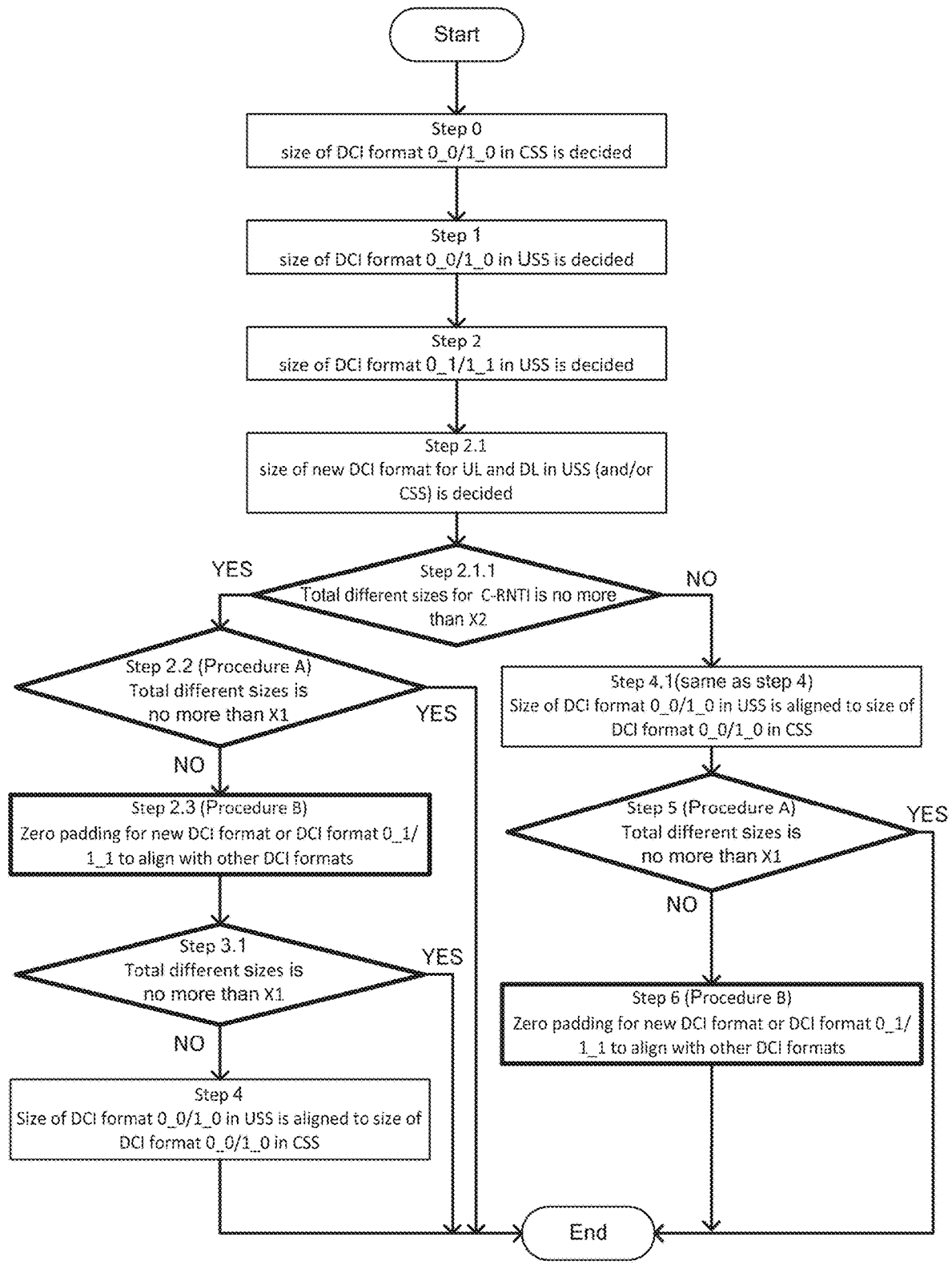
FIG. 3 is a flowchart illustrating Operation Example 1-3 according to Embodiment 1.

For example, as illustrated in FIG. 3, in Operation Example 1-3, Step 2.1.1 is performed before Step 2.2 of Operation Example 1-2 (e.g., between Step 2.1 and Step 2.2). In Step 2.1.1, whether or not the condition B "the total number of different DCI format sizes monitored by using the C-RNTI is not more than X2" is met is determined (or checked). This condition B corresponds to one of the conditions in Step 3 in Operation Example 1-2. Accordingly, in Operation Example 1-3, the condition A of the conditions A and B is checked in Step 3.1.

In a case where it is determined in Step 2.1.1 that the condition B is met (Step 2.1.1; YES), the processing proceeds to Step 2.2 (Procedure A). Meanwhile, in a case where it is determined in Step 2.1.1 that the condition B is not met (Step 2.1.1; NO), the processing proceeds to Step 4.1. Step 4.1 is processing equivalent to Step 4 in Operation Example 1-1 and Operation Example 1-2.

In a case where it is determined in Step 2.2 (Procedure A) that the condition A is met (Step 2.2; YES), the processing in Operation Example 1-3 may be finished. Meanwhile, in a case where it is determined that the condition A is not met (Step 2.2; NO), the processing proceeds to Step 2.3 (Procedure B).

In Step 2.3 (Procedure B), the size of the new DCI format and size(s) of other DCI format(s) are aligned, as in Operation Example 1-2.

After this size adjustment, whether or not the condition A "the total number of different DCI format sizes is not more than X1" is met is determined (or checked) again in Step 3.1. In a case where it is determined that the condition A is met (Step 3.1; YES), the processing may be finished. In a case where it is determined that the condition A is not met (Step 3.1; NO), the processing proceeds to Step 4.

In Step 4 and Step 4.1, for example, the size of the DCI format 0_0/1_0 in the CSS and the size of the DCI format 0_0/1_0 in the USS are aligned, as in Operation Example 1-1 and Operation Example 1-2.

After Step 4, the processing of Operation Example 1-3 may be finished. Meanwhile, after Step 4.1, for example, whether or not the condition A "the total number of different DCI format sizes is not more than X1" is met is determined (or checked) in Step 5 (Procedure A).

In a case where it is determined in Step 5 (Procedure A) that the condition A is met (Step 5; YES), the processing of Operation Example 1-3 may be finished. Meanwhile, in a case where it is determined that the condition A is not met (Step 5; NO), the processing proceeds to Step 6 (Procedure B).

In Step 6 (Procedure B), the size of the new DCI format and size(s) of other DCI format(s) are aligned. After Step 6 (Procedure B), the processing of Operation Example 1-3 may be finished.

Operation Example 1-3 has been described above. In Operation Example 1-2, Step 2.2 (Procedure A) and Step 2.3 (Procedure B) are performed before Step 4, and therefore the size of the new DCI format is adjusted in a case where the total number of different DCI format sizes is more than X1, irrespective of the total number of different DCI format sizes monitored by using the C-RNTI.

Meanwhile, in Operation Example 1-3, whether or not one (the condition B) of the conditions in Step 3 "the total number of different DCI format sizes monitored by using the C-RNTI is not more than X2" is met is checked before Step 4 and Step 4.1.

In a case where it is determined that the condition B is not met, the size of the DCI format 0_0/1_0 in the CSS and the size of the DCI format 0_0/1_0 in the USS are aligned in Step 4 or Step 4.1. A reason why the condition B is checked prior to the condition A is that size adjustment between different DCI formats monitored by using the C-RNTI cannot be accomplished by aligning the size of the new DCI format with size(s) of other DCI format(s) in a case where the new DCI format is not masked by the C-RNTI.

Furthermore, by aligning the size of the DCI format 0_0/1_0 in the CSS and the size of the DCI format 0_0/1_0 in the USS, the total number of different DCI format sizes can be decreased. It is therefore possible to finish the processing while skipping Step 5 (Procedure A) and Step 6 (Procedure B) in some cases, as described in Operation Example 1-1.

Furthermore, in Operation Example 1-2 or Operation Example 1-3, the size of the new DCI format and the size of the DCI format 0_0/1_0 in the USS are aligned before Step 4 in some cases. Then, in a case where the processing proceeds to Step 4, the size of the new DCI format is also aligned with the size of the new DCI format in the CSS. For example, in a case where the size of the new DCI format is smaller than the size of the DCI format 0_0/1_0 in the CSS, the size of the new DCI format is adjusted to the same size as the size of the DCI format 0_0/1_0 in the CSS by adding a bit to the new DCI format. As the added bit, 0 (zero padding) may be assumed or another known bit (string) may be assumed. In a case where the size of the new DCI format is larger than the size of the DCI format 0_0/1_0 in the CSS, the new DCI format for the CSS may be adjusted to match the size of the DCI format 0_0/1_0 in the CSS by deleting a designated bit such as a frequency assignment bit of the new DCI format. This operation of deleting a bit is also called "truncation", as described earlier.

Configuration of Radio Communication System

Figure 4:
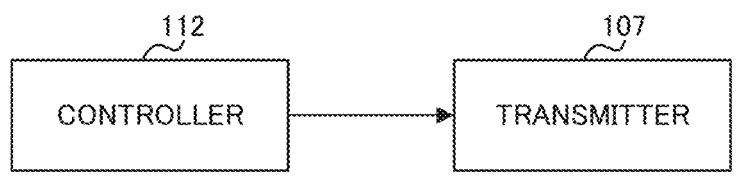
FIG. 4 is a block diagram illustrating an example of a configuration of a base station.
Figure 5:
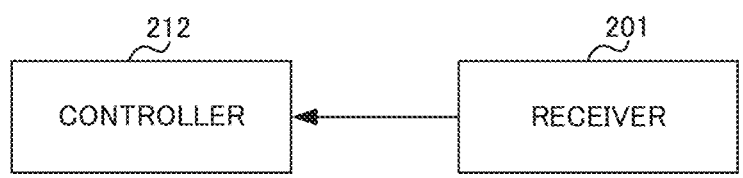
FIG. 5 is a block diagram illustrating an example of a configuration of a terminal.
Figure 6:
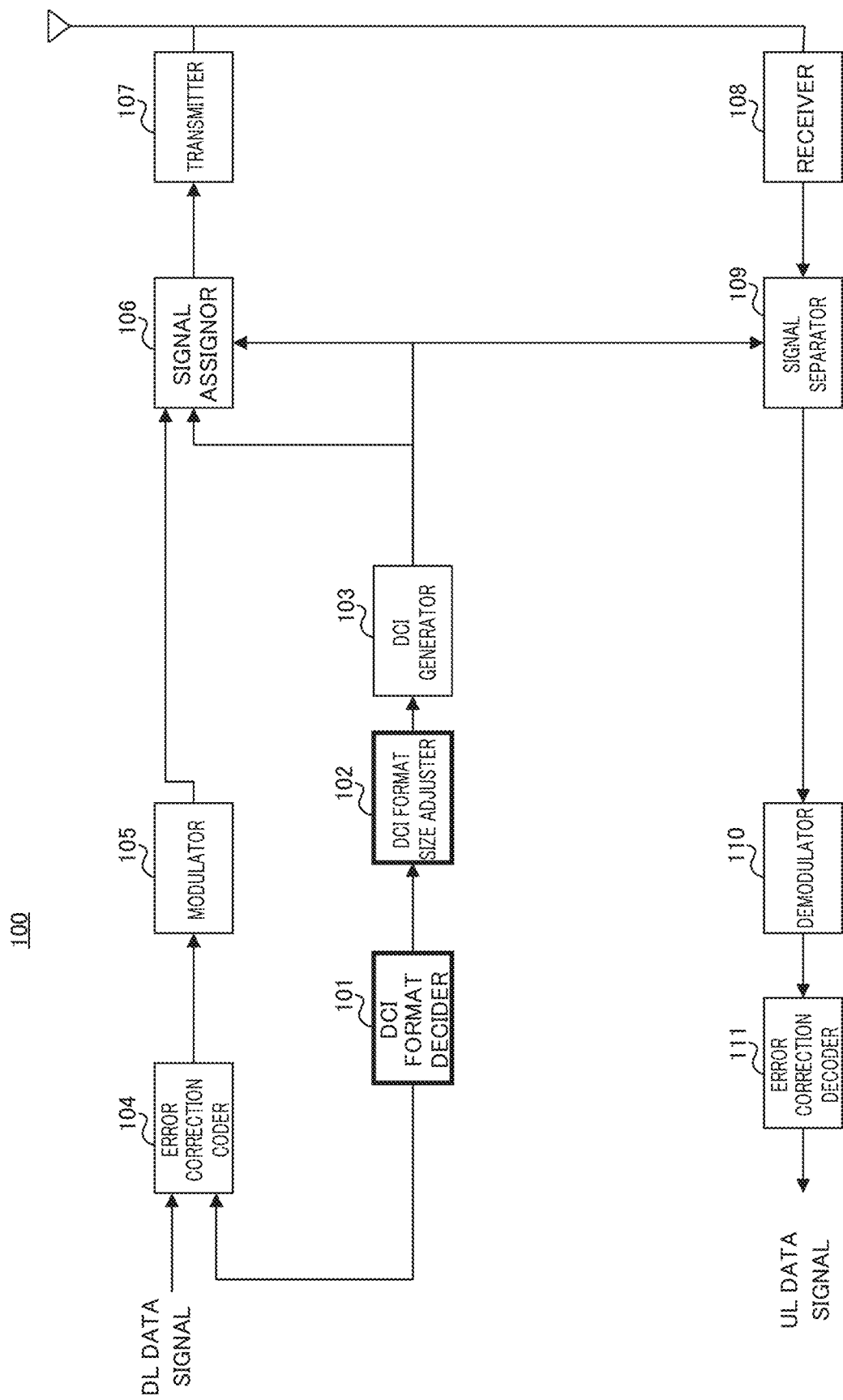
FIG. 6 is a block diagram illustrating an example of a configuration of the base station.
Figure 7:
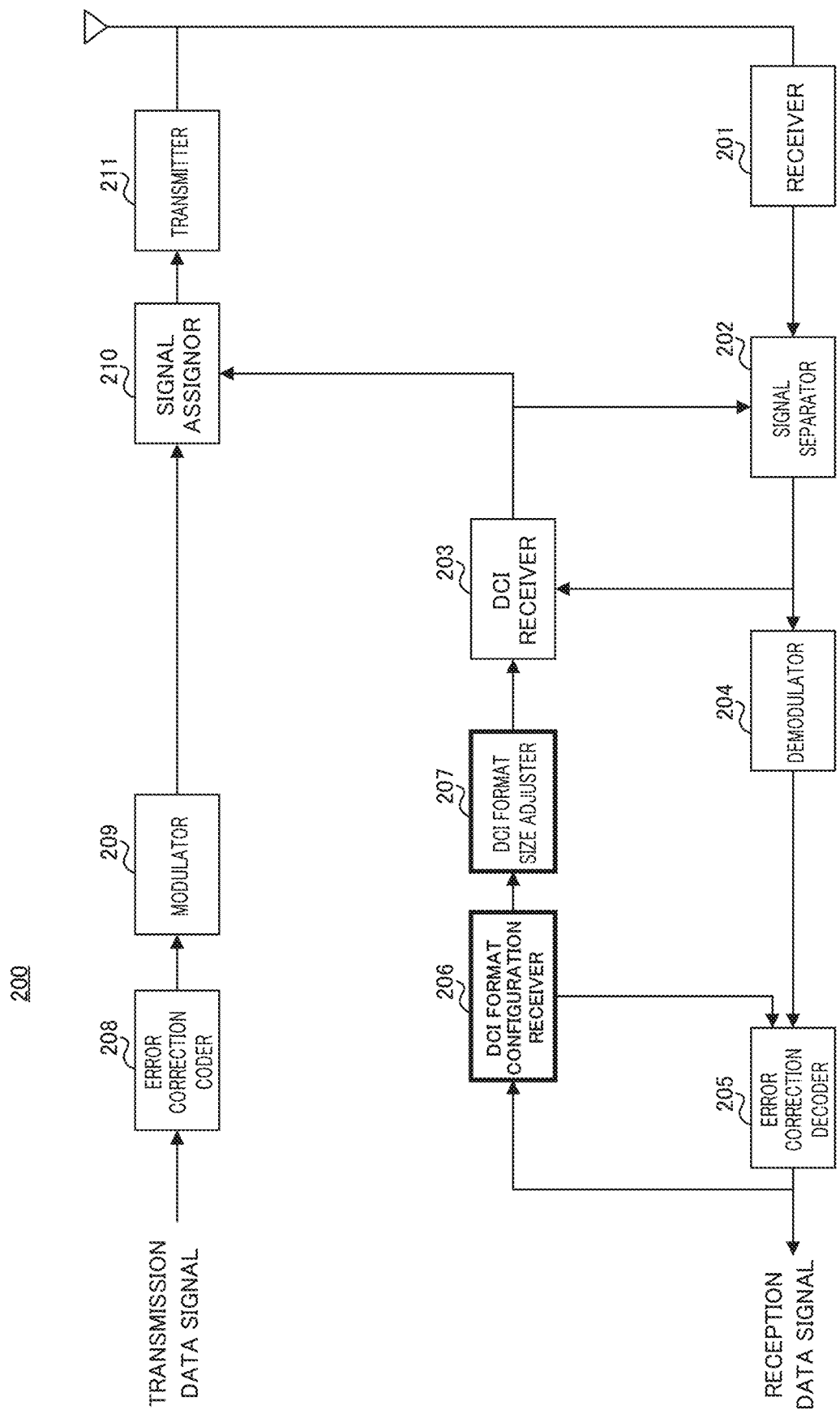
FIG. 7 is a block diagram illustrating an example of a configuration of the terminal.

A radio communication system according to an aspect of the present disclosure includes, for example, base station 100 (e.g., gNB) illustrated in FIGS. 4 and 6 and terminal 200 (e.g., UE) illustrated in FIGS. 5 and 7.

In base station 100 illustrated in FIG. 4, controller 112 decides a DCI format and adjusts a size of the DCI format, for example, in accordance with Operation Example 1-1, Operation Example 1-2, or Operation Example 1-3, and generates DCI for terminal 200.

Transmitter 107 transmits the DCI generated by controller 112 to terminal 200.

Meanwhile, in terminal 200 illustrated in FIG. 5, receiver 201 receives a DL signal transmitted by base station 100.

Controller 212, for example, extracts a higher layer signal in the received DL signal, and performs configuration of a received DCI format and size adjustment of the DCI format according to the configuration based on information on the DCI format indicated by the higher layer signal.

Configuration of Base Station 100

Base station 100 illustrated in FIG. 6 includes, for example, DCI format decider 101, DCI format size adjuster 102, and DCI generator 103. DCI format decider 101, DCI format size adjuster 102, and DCI generator 103 may be grasped as corresponding to an example of controller 112 illustrated in FIG. 4. Furthermore, base station 100 illustrated in FIG. 6 includes, for example, error correction coder 104, modulator 105, signal assignor 106, transmitter 107, receiver 108, signal separator 109, demodulator 110, and error correction decoder 111.

Error correction coder 104, modulator 105, signal assignor 106, and transmitter 107 may be grasped as corresponding to an example of a transmission processor that performs DL transmission processing. Receiver 108, signal separator 109, demodulator 110, and error correction decoder 111 may be grasped as corresponding to an example of a reception processor that performs UL reception processing.

DCI format decider 101, for example, decides a DCI format used for terminal 200 by base station 100 for each cell (e.g., SpCell and SCell). Note that "SpCell" is an abbreviation for "special cell," and "SCell" is an abbreviation for "secondary cell." "SpCell" is, for example, a primary cell (PCell) or a primary secondary cell (PSCell).

Information on the DCI format decided for each cell by DCI format decider 101 is, for example, output to error correction coder 104 and DCI format size adjuster 102. Note that the information on the DCI format output to error correction coder 104 may be grasped as corresponding to an example of information of which terminal 200 is notified by higher layer signaling.

DCI format size adjuster 102, for example, decides which DCI format terminal 200 monitors for each cell based on the information (hereinafter also referred to as "configuration information") on the DCI format input from DCI format decider 101. The configuration information on the DCI format may include configuration information "monitor DCI format 0_0/1_0 in CSS", for example, in a case of SpCell.

DCI format size adjuster 102 determines whether or not to adjust a size of the DCI format and adjusts the size of the DCI format in accordance with a result of the determination based on the configuration information on the DCI format as illustrated in Operation Example 1-1, Operation Example 1-2, or Operation Example 1-3. Information on the DCI format whose size has been adjusted is, for example, output to DCI generator 103.

DCI generator 103 generates, for example, DCI that is a control signal for DL data assignment and DCI that is a control signal for UL data assignment based on the information on the DCI format input from DCI format size adjuster 102.

The generated DCI is, for example, output to signal assignor 106 as an example of transmission data. For example, The DCI for the DL data assignment is output to signal assignor 106. The DCI for the UL data assignment is output not only to signal assignor 106 but also to signal separator 109 as an example of a control signal indicating a position where the UL data has been assigned.

Error correction coder 104, for example, receives a transmission data signal (DL data signal) and higher layer signaling, performs error correction coding on the input signal, and outputs the signal to modulator 105.

Modulator 105, for example, performs modulation processing on the signal input from error correction coder 104 and outputs the modulated data signal to signal assignor 106.

Signal assignor 106, for example, forms a transmission signal by assigning the DL data signal and the DCI that is an example of a control signal input from DCI generator 103 to a radio resource. The formed transmission signal is output to transmitter 107.

Transmitter 107, for example, generates a radio signal by performing radio transmission processing such as upconvertion and amplification on the input signal from signal assignor 106 and transmits the radio signal from an antenna.

Receiver 108, for example, receives a UL radio signal transmitted from terminal 200 by an antenna, performs radio reception processing such as amplification and downconvertion on the received radio signal, and outputs the radio signal to signal separator 109.

Signal separator 109, for example, separates (or extracts) a reception signal (e.g., UL data signal) assigned to a UL radio resource based on UL resource assignment information input from DCI generator 103. The separated UL data signal is output to demodulator 110.

Demodulator 110, for example, performs demodulation processing on the input signal from signal separator 109 and outputs the demodulated signal to error correction decoder 111.

Error correction decoder 111, for example, decodes the input signal from demodulator 110 and outputs the UL reception data signal from terminal 200.

Configuration of Terminal 200

Terminal 200 illustrated in FIG. 7 includes, for example, receiver 201, signal separator 202, DCI receiver 203, demodulator 204, and error correction decoder 205. Further, terminal 200 includes, for example, DCI format configuration receiver 206, DCI format size adjuster 207, error correction coder 208, modulator 209, signal assignor 210, and transmitter 211.

Receiver 201, signal separator 202, DCI receiver 203, demodulator 204, and error correction decoder 205 may be grasped as corresponding to a reception processor that performs DL reception processing. DCI format configuration receiver 206 and DCI format size adjuster 207 may be grasped as corresponding to an example of controller 212 illustrated in FIG. 5. Error correction coder 208, modulator 209, signal assignor 210, and transmitter 211 may be grasped as corresponding to an example of a transmission processor that performs UL transmission processing.

Receiver 201, for example, receives a DL reception signal by an antenna, performs radio reception processing such as amplification and downconvertion on the reception signal, and then outputs the reception signal to signal separator 202.

Signal separator 202, for example, separates a signal assigned to a PDCCH candidate position in the reception signal input from receiver 201 and outputs the signal to DCI receiver 203. Furthermore, signal separator 202, for example, separates a DL data signal from the reception signal based on DL resource assignment information input from DCI receiver 203 and outputs the DL data signal to demodulator 204.

DCI receiver 203, for example, detects DCI in output of signal separator 202 based on information (e.g., kind and/or size) on a DCI format input from DCI format size adjuster 207. Furthermore, DCI receiver 203 demodulates and receives the detected DCI.

Information on the decoded DCI is, for example, selectively output to signal separator 202 and signal assignor 210. For example, in the decoded DCI information, DL resource assignment information is output to signal separator 202, and UL resource assignment information is output to signal assignor 210.

Demodulator 204, for example, performs demodulation processing on the input signal from signal separator 202 and outputs the demodulated signal to error correction decoder 205.

Error correction decoder 205, for example, decodes the demodulated signal input from demodulator 204 and outputs a reception data signal. Higher layer signaling is, for example, output to DCI format configuration receiver 206.

DCI format configuration receiver 206, for example, configures, for each cell, a DCI format to be used based on the higher layer signaling input from error correction decoder 205 and outputs configuration information to DCI format size adjuster 207.

DCI format size adjuster 207, for example, decides which DCI format is to be monitored for each cell as in base station 100 based on the configuration information on the DCI format input from DCI format configuration receiver 206. Note that in a case where the cell is SpCell, the configuration information on the DCI format may include, for example, the configuration "monitor DCI format 0_0/1_0 in CSS."

Furthermore, DCI format size adjuster 207 decides a DCI format to be monitored, and then determines whether or not to adjust a size of the DCI format and adjusts the size of the DCI format in accordance with a result of the determination, for example, as illustrated in Operation Example 1-1, Operation Example 1-2, or Operation Example 1-3. Information on the DCI format whose size has been adjusted is output to DCI receiver 203.

Error correction coder 208, for example, receives a UL transmission data signal, performs error correction coding on the input transmission data signal, and outputs the transmission data signal to modulator 209.

Modulator 209 modulates the signal input from error correction coder 208 and outputs the modulated signal to signal assignor 210.

Signal assignor 210, for example, identifies a radio resource assigned to the UL data signal based on the UL resource assignment information input from DCI receiver 203 and assigns the UL data signal to the identified radio resource.

Transmitter 211 generates a radio signal by performing radio transmission processing such as upconvertion and amplification on the input signal from signal assignor 210 and transmits the radio signal from an antenna.

Supplements to Embodiment 1

Which of Operation Example 1-1, Operation Example 1-2, and Operation Example 1-3 is used (or applied) in base station 100 and terminal 200 may be decided in advance or may be selected in accordance with a condition of operation. Which of Operation Examples 1-1 to 1-3 is used may be decided by higher layer signaling.

Although it is assumed in Embodiment 1 that the new DCI format is masked by an RNTI different from the C-RNTI, the new DCI format may be masked by the C-RNTI. In this case, information (e.g., an identification bit) for identifying an existing DCI format and the new DCI format may be added to one of or both of the individual DCI formats. Even in a case where the existing DCI format and the new DCI format have the same size, the existing DCI format and the new DCI format can be identified or distinguished by the identification bit.

Furthermore, in a case where the new DCI format is masked by the C-RNTI, the same determination conditions as Step 3 may be used in "Procedure A" in Operation Example 1-1 and Operation Example 1-2 (FIG. 2) by adding the restriction (the condition B) on the total number of different sizes concerning the C-RNTI.

In Operation Example 1-1, Operation Example 1-2, and Operation Example 1-3, the values X1 and X2 concerning the total number of different DCI format sizes may be decided by configuration of a higher layer or may be predetermined values.

Although a DCI format extended for URLLC is assumed as an example of the new DCI format in Embodiment 1, a DCI format extended for another purpose or use may be the "new DCI format." Non-limiting examples of the DCI format extended for another purpose or use include DCI formats for an unlicensed band, for machine type communication (MTC), for narrow band-internet of things (NB-IoT), for vehicle-to-everything (V2X), and for multiple-input and multiple-output (MIMO).

In Operation Example 1-1 and Operation Example 1-2, in Step 3, the flow goes to the "YES" route in a case where both of the following two conditions A and B are met, and the flow goes to the "NO" (Step 4) route in a case where at least one of the two conditions A and B is not met.
  (Condition A) the total number of different DCI format sizes is not more than X1
  (Condition B) the total number of different DCI format sizes monitored by using the C-RNTI is not more than X2

However, similar operation is realized, for example, even in a case where the condition A and condition B are replaced with the following condition A1 and condition B1, respectively:
  (Condition A1) the total number of different DCI format sizes is equal to or less than X1
  (Condition B1) the total number of different DCI format sizes monitored by using the C-RNTI is equal to or less than X2.

Furthermore, the condition A and condition B may be replaced with the following condition A2 and condition B2, respectively, and in a case where at least one of the conditions A2 and B2 is met, the flow may proceed to Step 4, and in a case where neither the condition A2 nor the condition B is met, the flow may proceed to the other route.
  (Condition A2) the total number of different DCI format sizes is more than X1
  (Condition B2) the total number of different DCI format sizes monitored by using the C-RNTI is more than X2

In "Procedure A," in a case where the condition A "the total number of different DCI format sizes is not more than X1" is met, the flow goes to the "YES" route, and in a case where the condition A "the total number of different DCI format sizes is not more than X1" is not met, the flow goes to the "NO" (Procedure B) route. However, similar operation is realized even in a case where the condition A is replaced with the condition A1 "the total number of different DCI format sizes is equal to or less than X1".

Furthermore, in "Procedure A," in a case where the condition A2 "the total number of different DCI format sizes is more than X1" is met, the flow may proceed to the "Procedure B," and in a case where the condition A2 "the total number of different DCI format sizes is more than X1" is not met, the flow may proceed to the other route.

Embodiment 2

In Embodiment 2, an example of "Procedure B" in Embodiment 1 is described. In Procedure B, sizes of a new DCI format and other DCI format(s) are made equal. As a result, the condition A "the total number of different DCI format sizes is not more than X1" is met.

In Embodiment 2, it is assumed that sizes of the DCI formats have the following relationship:

size of DCI format 0_0/1_0 in CSS<=size of DCI format 0_0/1_0 in USS<=size of DCI format 0_1 and 1_1 in USS Furthermore, in a case where both of a new DCI format for DL grant and a new DCI format for UL grant are configured, the following settings (1) to (3) are assumed.

(1) The new DCI format for the DL grant and the new DCI format for the UL grant are set to have the same size. This can suppress an increase in the number of sizes of different DCI formats caused by addition of the new DCI formats.

(2) The new DCI format for the DL grant and the new DCI format for the UL grant can be set to have different sizes but are adjusted to have the same size before Procedure B. In a case where the condition A "the total number of different DCI format sizes is not more than X1" is met by setting the new DCI format and the DCI format for the UL grant to have the same size before Procedure B, Procedure B is skipped. In this way, different DCI format sizes can be set for DL assignment and UL grant in a case where there is a room for different DCI format sizes, and therefore, for example, the number of padding bits can be reduced.

(3) The new DCI format for the DL grant and the new DCI format for the UL grant can be set to have different sizes, and Procedure B is performed on any one of the new DCI format for the DL grant and the new DCI format for the UL grant. In a case where the condition A "the total number of different DCI format sizes is not more than X1" is met, Procedure B for the other new DCI format is skipped. In a case where the condition A "the total number of different DCI format sizes is not more than X1" is not met, Procedure B is performed on the other new DCI format. On which of the new DCI format for the DL grant and the new DCI format for the UL grant Procedure B is performed (or applied) earlier may be decided in advance or Procedure B may be performed on one of these new DCI formats that has a smaller size or a larger size. In this way, in a case where the condition A "the total number of different DCI format sizes is not more than X1" is met by size adjustment of any one of the new DCI formats, the other new DCI format can keep the set size.

Furthermore, a case where both of a new DCI format for the USS and a new DCI format for the CSS are configured to be monitored and the new DCI format for the USS and the new DCI format for the CSS have different sizes can also be assumed. In this case, the following settings (1) to (3) are assumed as in a case where the new DCI format for the DL assignment and the new DCI format for the UL grant have different sizes.

(1) The new DCI format for the CSS and the new DCI format for the USS are set to have the same size. This can suppress an increase in the number of sizes of different DCI formats caused by addition of the new DCI formats.

(2) The new DCI format for the CSS and the new DCI format for the USS can be set to have different sizes but are adjusted to have the same size before Procedure B. In a case where the condition A "the total number of different DCI format sizes is not more than X1" is met by adjusting the new DCI format for the CSS and the new DCI format for the USS to have the same size before Procedure B, Procedure B is skipped. In this way, the new DCI format for the CSS and the new DCI format for the USS can be set to have different sizes in a case where there is a room for different DCI format sizes, and therefore the number of padding bits can be reduced.

(3) The new DCI format for the CSS and the new DCI format for the USS can be set to have different sizes, and Procedure B is performed on any one of the new DCI format for the CSS and the new DCI format for the USS. In a case where the condition A "the total number of different DCI format sizes is not more than X1" is met, Procedure B for the other new DCI format is skipped. In a case where the condition A "the total number of different DCI format sizes is not more than X1" is not met, Procedure B is performed on the other new DCI format. On which of the new DCI format for the CSS and the new DCI format for the USS Procedure B is performed (or applied) earlier may be decided in advance or the Procedure B may be performed on one of these new DCI formats that has a smaller size or a larger size. In this way, in a case where the condition A "the total number of different DCI format sizes is not more than X1" is met by size adjustment of any one of the new DCI formats, the other new DCI format can keep the set size.

Figure 8:
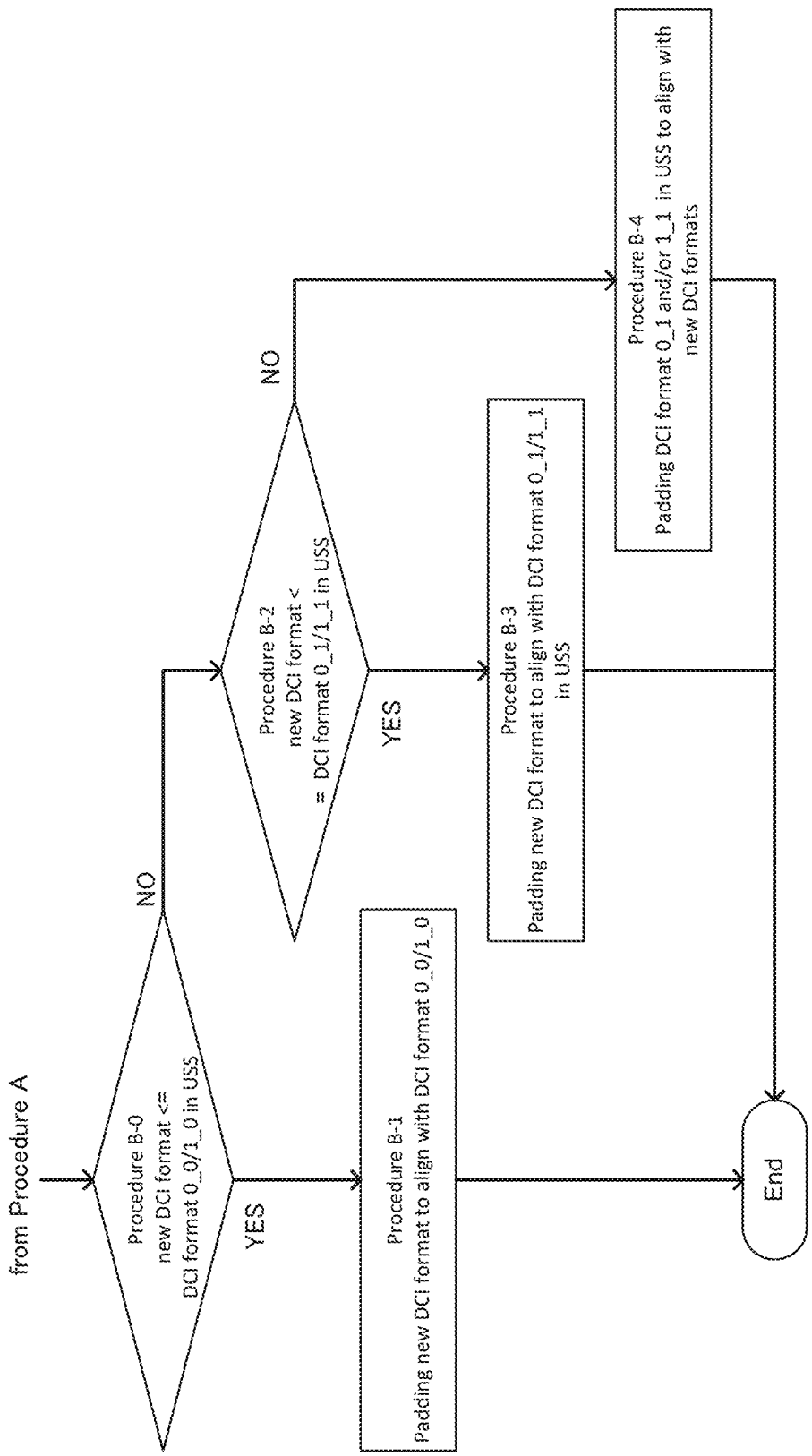
FIG. 8 is a flowchart illustrating an operation example according to Embodiment 2.

FIG. 8 is a flowchart illustrating an operation example according to Embodiment 2.

In Procedure B-0, it is determined whether or not a size of a new DCI format is equal to or less than a size of the DCI format 0_0/1_0 in the USS. In a case where the size of the new DCI format is equal to or less than the size of the DCI format 0_0/1_0 in the USS (YES), the processing proceeds to Procedure B-1, and in a case where the size of the new DCI format is larger than the size of the DCI format 0_0/1_0 in the USS (NO), the processing proceeds to Procedure B-2.

In Procedure B-1, the size of the new DCI format is adjusted to match the size of the DCI format 0_0/1_0. An example of this will be described in Operation Example 2-1, which will be described later.

In Procedure B-2, it is determined whether or not the size of the new DCI format is equal to or less than a size of the DCI format 0_1/1_1 in the USS. In a case where the size of the new DCI format is equal to or less than the size of the DCI format 0_1/1_1 in the USS (YES), the processing proceeds to Procedure B-3, and in a case where the size of the new DCI format is larger than the size of the DCI format 0_1/1_1 in the USS (NO), the processing proceeds to B-4.

In Procedure B-3, the size of the new DCI format is adjusted to match the size of the DCI format 0_1/1_1. An example of this will be described in Operation Example 2-2, which will be described later.

In Procedure B-4, the size of the DCI format 0_1 or the DCI format 1_1 is adjusted to match the size of the new DCI format. An example of this will be described in Operation Example 2-3, which will be described later.

According to the operation illustrated in FIG. 8, in a case where the size of the new DCI format is smaller than size(s) of other DCI format(s), the size of the new DCI format is adjusted to match a size of a DCI format whose size is larger than the size of the new DCI format but is small among the other DCI format(s). It is therefore possible to reduce the number of padding bits.

Even in a case where the size of the new DCI format is larger than the size(s) of the other DCI format(s), the size of the new DCI format can be aligned with the size(s) of the other DCI format(s) by Procedure B-4. It is therefore possible to reduce (in other words, mitigate) restrictions on the number of set bits of the new DCI format.

Figure 9:
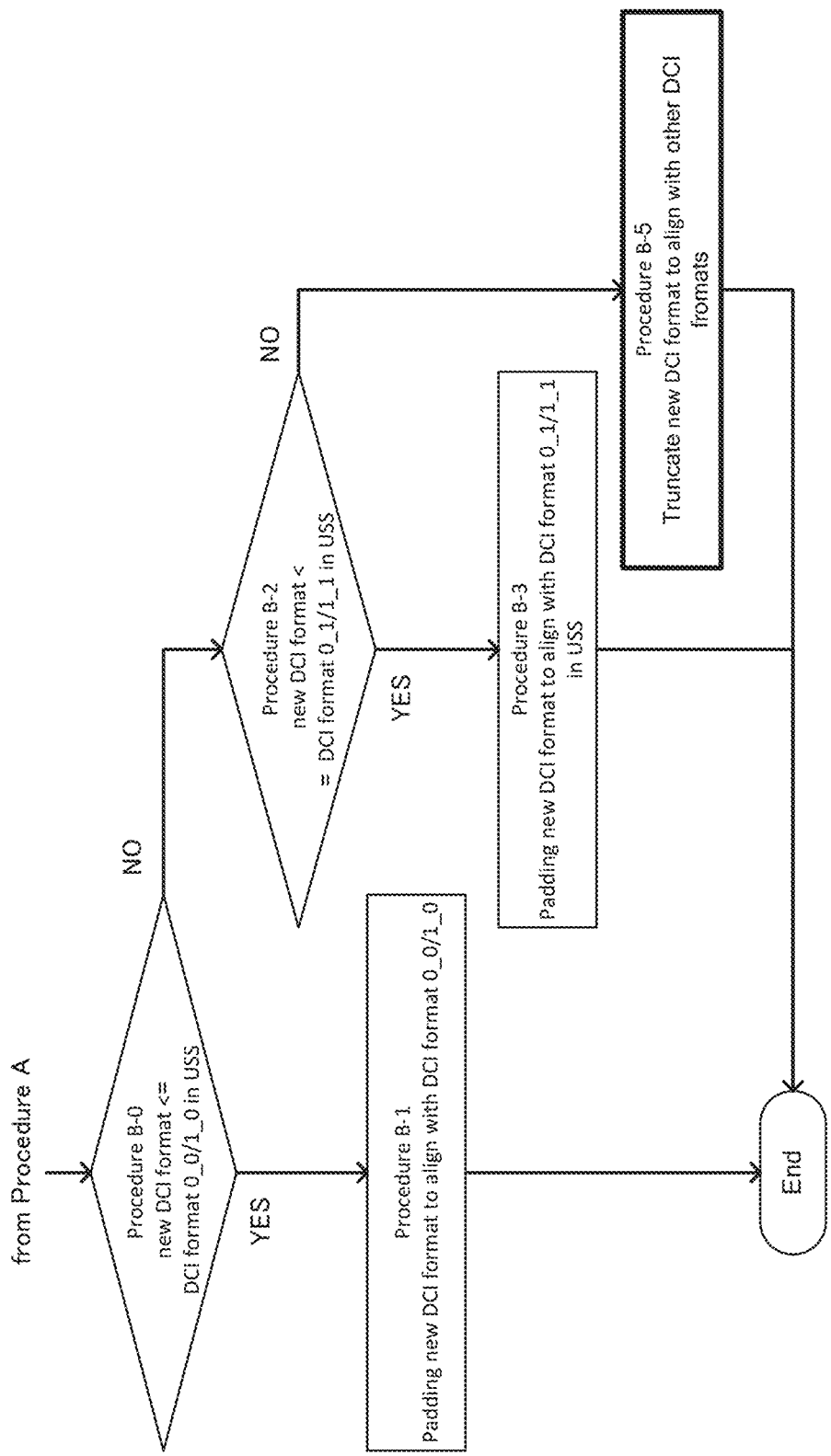
FIG. 9 is a flowchart illustrating another operation example according to Embodiment 2.

Note that Procedure B-4 described above may be replaced with the following Procedure B-5 as illustrated in FIG. 9.

Procedure B-5: The set bits of the new DCI format are partially deleted to adjust the size of the new DCI format to match the size(s) of the other DCI format(s). An example of this will be described in Operation Example 2-4, which will be described later.

Operation Example 2-1

In Operation Example 2-1, an example of Procedure B-1 illustrated in FIGS. 8 and 9 is described. Non-limiting examples of Operation Example 2-1 include three Operation Examples 2-1-1 to 2-1-3. Which of Operation Examples 2-1-1 to 2-1-3 is applied may be decided in advance or may be decided by higher layer signaling.

Operation Example 2-1-1

Operation Example 2-1-1 can be applied to Step 2.3 (Procedure B) in Operation Example 1-2 and Step 2.3 (Procedure B) in Operation Example 1-3 according to Embodiment 1.

Figure 10:
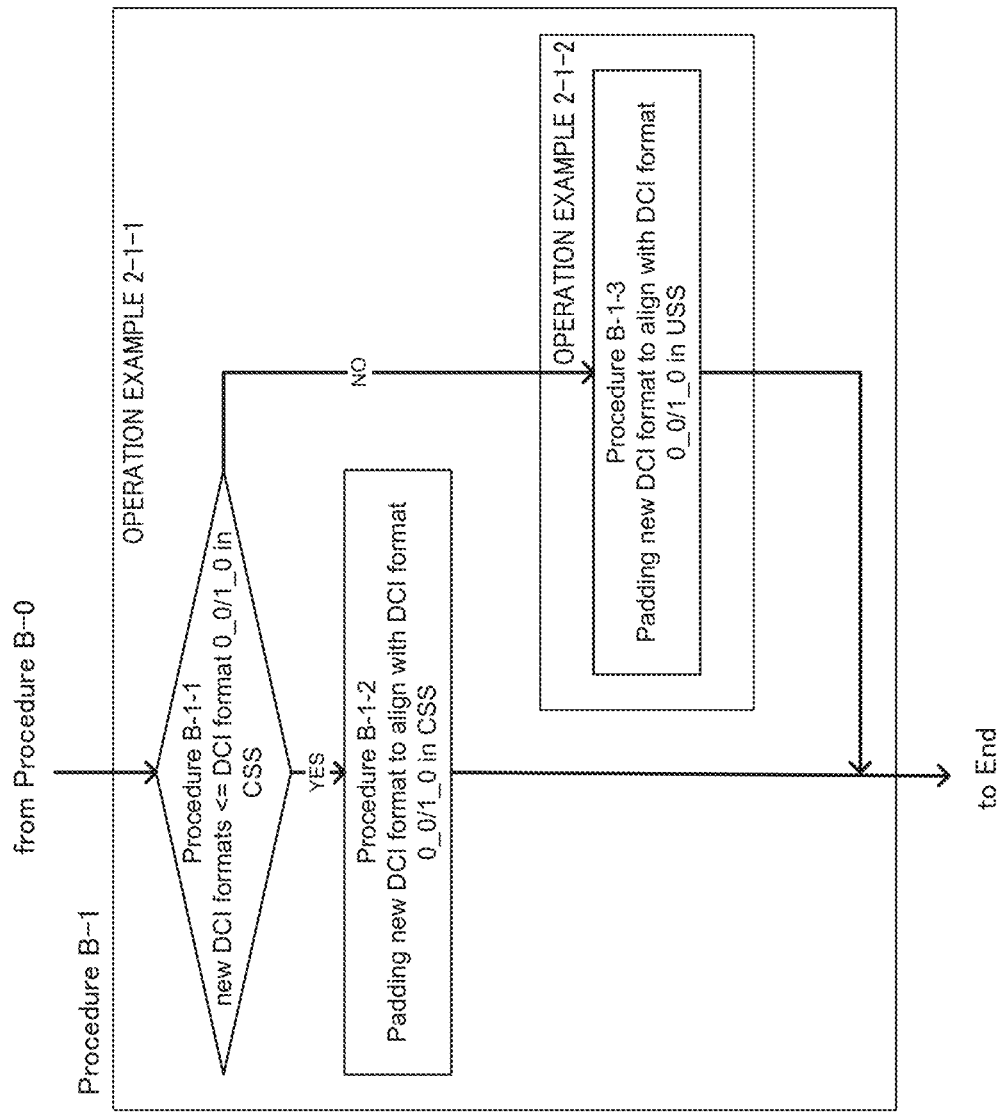
FIG. 10 is a flowchart illustrating Operation Example 2-1-1 according to Embodiment 2.

In Operation Example 2-1-1, it is assumed that the DCI format_0_0/1_0 in the CSS and the DCI format_0_0/1_0 in the USS have different sizes and the size of the DCI format_0_0/1_0 in the CSS is smaller than the size of the DCI format_0_0/1_0 in the USS. FIG. 10 is a flowchart of Operation Example 2-1-1.

In Procedure B-1-1, it is determined whether or not the size of the new DCI format is equal to or less than the size of the DCI format 0_0/1_0 in the CSS. In a case where the size of the new DCI format is equal to or less than the size of the DCI format 0_0/1_0 in the CSS (YES), the processing proceeds to Procedure B-1-2. In a case where the size of the new DCI format is larger than the size of the DCI format_0_0/1_0 in the CSS (NO), the processing proceeds to Procedure B-1-3.

In Procedure B-1-2, the size of the new DCI format is adjusted to have the same size as the DCI format 0_0/1_0 in the CSS by adding a bit to the new DCI format. As the added bit, zero (zero padding) may be assumed or another known bit (string) may be assumed. By adding zero or the known bit (string), for example, zero or the known bit (string) can be used for error detection when UE detects DCI. It is therefore possible to reduce a DCI reception error rate.

In Procedure B-1-3, the new DCI format is adjusted to have the same size as the DCI format 0_0/1_0 in the USS by adding a bit to the new DCI format. As the added bit, zero (zero padding) may be assumed or another known bit (string) may be assumed, as in Procedure B-1-2.

In Operation Example 2-1-1, the number of bits added to the new DCI format can be reduced since the size of the new DCI format is adjusted to match a size of a DCI format having a smaller size. It is therefore possible to increase reception quality of the new DCI format as compared with other operation examples.

In a case where the USS and the CSS overlap each other, the size of the new DCI format configured in the USS is aligned with the size of the DCI format in the CSS, and thereby the number of times of blind detection (BD) of DCI at UE can be reduced. For example, the number of times of BD of DCI may be counted as one for DCI formats having the same size even in a case where different RNTIs are used. In a case where the USS and the CSS do not overlap each other, the size of the new DCI format configured in the USS is aligned with the size of the DCI format in the CSS, and thereby the total number of different DCI format sizes can be reduced.

Operation Example 2-1-2

Operation Example 2-1-2 can be applied to Procedure B in all of Operation Example 1-1, 1-2, and 1-3 according to Embodiment 1. In Operation Example 2-1-2, Procedure B-1-3 illustrated in FIG. 10 is applied alone. In Procedure B-1-3, even in a case where the new DCI format is configured in the USS and the size of the new DCI format is set smaller than the size of the DCI format 0_0/1_0 in the CSS, the size of the new DCI format can be aligned with the size of the DCI format 0_0/1_0 in the USS. Therefore, in a case where the USS and the CSS overlap each other, the number of times of BD by UE can be reduced.

Operation Example 2-1-3

Operation Example 2-1-3 can be applied to Step 2.3 (Procedure B) of Operation Example 1-2 and Step 2.3 (Procedure B) of Operation Example 1-3 according to Embodiment 1.

In Operation Example 2-1-3, it is assumed that the DCI format_0_0/1_0 in the CSS and the DCI format_0_0/1_0 in the USS have different sizes and the size of the DCI format 0_0/1_0 in the CSS is smaller than the size of the DCI format_0_0/1_0 in the USS. Furthermore, it is assumed that a new DCI format can also be configured in the CSS, and the new DCI format and the new DCI format in the USS can have different sizes.

Figure 11:
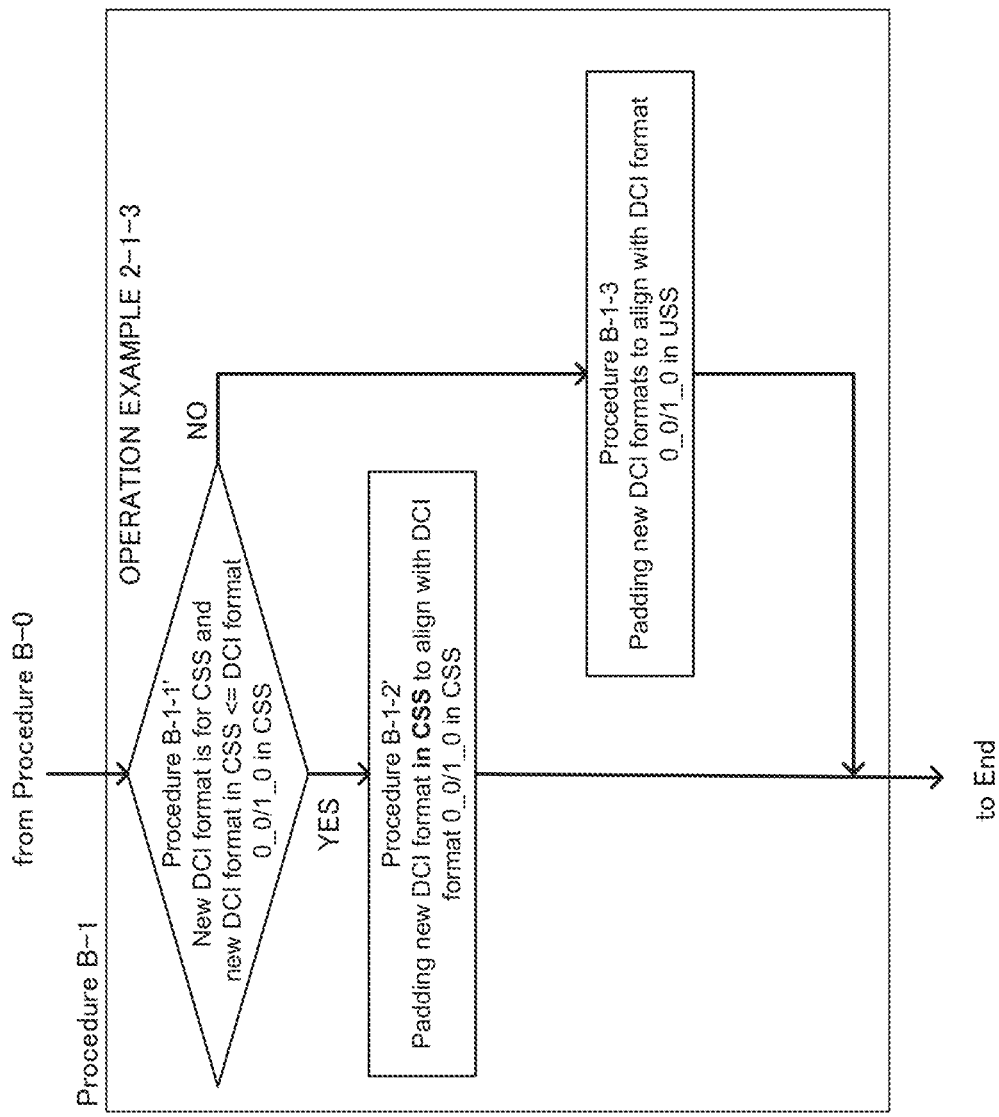
FIG. 11 is a flowchart illustrating Operation Example 2-1-3 according to Embodiment 2.

FIG. 11 is a flowchart of Operation Example 2-1-3.

In Procedure B-1-1', it is determined whether or not the new DCI format is for the CSS and the size of the new DCI format for the CSS is equal to or smaller than the size of the DCI format_0_0/1_0 in the CSS. In a case where the new DCI format is for the CSS and the size of the new DCI format for the CSS is equal to or smaller than the size of the DCI format_0_0/1_0 in the CSS (YES), the processing proceeds to Procedure B-1-2'. In a case where the size of the new DCI format for the CSS is larger than the size of the DCI format_0_0/1_0 in the CSS (NO), the processing proceeds to Procedure B-1-3. That is, even in a case where the new DCI format is for the CSS, the processing proceeds to Procedure B-1-3 in a case where the size of the new DCI format for the CSS is larger than the size of the DCI format0_0/1_0 in the CSS, and in a case where the new DCI format is for the USS, the processing proceeds to Procedure B-1-3 irrespective of the size of the new DCI format for the USS.

In Procedure B-1-2', the new DCI format for the CSS is adjusted to have the same size as the DCI format0_0/1_0 in the CSS by adding a bit to the new DCI format for the CSS. As the added bit, zero (zero padding) may be assumed or another known bit (string) may be assumed, as in Procedure B-1-2.

Procedure B-1-3 is similar to that in Operation Example 2-1-1 and Operation Example 2-1-2. For example, in Procedure B-1-3, the new DCI format is adjusted to have the same size as the DCI format 0_0/1_0 in the USS by adding a bit to the new DCI format. As the added bit, zero (zero padding) may be assumed or another known bit (string) may be assumed, as in Procedure B-1-2.

According to Operation Example 2-1-3, in a case where the DCI format 0_0/1_0 for the CSS and the DCI format 0_0/1_0 for the USS have different sizes, the size of the new DCI format for the CSS can be adjusted to match the size of the DCI format 0_0/1_0 for the CSS, and the size of the new DCI format for the USS can be adjusted to match the size of the DCI format 0_0/1_0 for the USS. In a case where search spaces of the new DCI format and the DCI format 0_0/1_0 overlap in each of the CSS and the USS, the number of times of BD by UE can be reduced.

In Operation Example 2-1-3, the size of the new DCI format for the CSS is compared with the size of the DCI format 0_0/1_0 for the CSS in Procedure B-1-1'. In a case where the size of the new DCI format for the CSS is larger than the size of the DCI format 0_0/1_0 for the CSS, the size of the new DCI format for the CSS is adjusted to match the size of the DCI format 0_0/1_0 for the USS. However, the size of the new DCI format for the CSS may be adjusted to match the size of the DCI format 0_1/1_0 for the CSS irrespective of the size thereof.

Furthermore, in a case where the size of the new DCI format for the CSS is larger than the size of the DCI format 0_0/1_0 for the CSS, the size of the new DCI format for the CSS may be adjusted to match the size of the DCI format 0_0/1_0 for the CSS, for example, by deleting a designated bit such as a frequency assignment bit of the new DCI format. This operation of deleting a bit is also called "truncation", as described earlier.

Furthermore, in a case where the size of the new DCI format for the CSS is larger than the size of the DCI format 0_0/1_0 for the CSS, detection of the new DCI format for the CSS may be stopped.

In the method of deleting a bit and the method of stopping DCI detection, the size of the DCI format 0_0/1_0 for the CSS is not changed. Accordingly, UE can continue communication by using the DCI format 0_0/1_0 for the CSS, for example, even during a period where the UE does not detect (or cannot read) the DCI format for the USS, for example, due to reconfiguration of a higher layer.

Although the relationship "size of DCI format 0_0/1_0 in CSS<=size of DCI format 0_0/1_0 in USS<=size of DCI format 0_1 and 1_1 in USS" is assumed in Operation Example 2-1, the relationship among sizes of the DCI formats is not limited to this assumption.

For example, the relationship "size of new DCI format<size of DCI format 0_1 and 1_1 in USS<size of DCI format 0_0 and 1_0 in USS" may be assumed. In this case, the size of the new DCI format may be adjusted to match the size of the DCI format 0_1 and 1_1 in the USS in Procedure B3.

Operation Example 2-2

In Operation Example 2-2, an example of Procedure B-3 illustrated in FIGS. 8 and 9 is described. Non-limiting examples of Operation Example 2-2 include five Operation Examples 2-2-1 to 2-2-5. Which of Operation Examples 2-2-1 to 2-2-5 is applied may be decided in advance or may be decided by higher layer signaling.

Operation Example 2-2-1

In Operation Example 2-2-1, a size of a new DCI format for DL assignment or a size of a new DCI format for UL grant is adjusted to match a size of one of the DCI format 0_1 (for UL grant) and the DCI format 1_1 (for DL assignment) that is larger than the new DCI format and has a smaller size.

Accordingly, both of the size of the new DCI format for the DL assignment and the size of the new DCI format for the UL grant are adjusted. In a case where the size of the new DCI format is smaller than the size of the one of the DCI format 0_1 and the DCI format 1_1 that has the smaller size, the size of the new DCI format for the DL assignment and the size of the new DCI format for the UL grant become the same.

According to Operation Example 2-2-1, the size of the new DCI format is adjusted to match the size of the one of the DCI format 0_1 and the DCI format 1_1 that has the smaller size, and therefore the number of padding bits can be reduced.

Operation Example 2-2-2

In Operation Example 2-2-2, the size of the new DCI format for the DL assignment is adjusted to match the size of the DCI format 1_1 (for DL assignment), and the size of the new DCI format for the UL grant is adjusted to match the size of the DCI format 0_1 (for UL grant). In a case where the DCI format 1_1 or the DCI format 0_1 is not configured, the size of the new DCI format may be adjusted to match a size of a DCI format that is configured.

According to Operation Example 2-2-2, sizes of DL control signals can be adjusted to match each other, and sizes of UL controls signal can be adjusted to match each other. Accordingly, for example, even in a case where a UL BWP is changed, a DL control signal can be used continuously without a change in size. In other words, UE can continue blind detection concerning a DL control signal.

Operation Example 2-2-3

In Operation Example 2-2-3, both of the size of the new DCI format for the DL assignment and the size of the new DCI format for the UL grant are adjusted to match the size of the DCI format 1_1. In a case where the DCI format 1_1 is not configured and in a case where the size of the new DCI format is larger than the size of the DCI format 1_1 and is equal to or smaller than the size of the DCI format 0_1, the size of the new DCI format DCI for the DL assignment and the size of the new DCI format DCI for the UL grant may be adjusted to match the size of the format 0_1.

According to Operation Example 2-2-3, even in a case where a UL BWP is changed, size change for adjusting the size of the new DCI format for the UL grant to match the size of the DCI format 1_1 need not be performed in some cases.

Operation Example 2-2-4

In Operation Example 2-2-4, the size of the new DCI format for the DL assignment is adjusted to match the size of the DCI format 0_1 (for UL grant), and the size of the new DCI format for the UL grant is adjusted to match the size of the DCI format 1_1 (for DL assignment). In a case where the DCI format 1_1 or the DCI format 0_1 is not configured, the new DCI format DCI may be adjusted to match a DCI format that is configured.

According to Operation Example 2-2-4, sizes of a control signal for DL and a control signal for UL are adjusted to match each other. In a case where the sizes of the control signal for DL and the control signal for UL are close to each other (for example, a difference in size is equal to or less than a threshold value), the number of padding bits can be reduced in some cases.

Operation Example 2-2-5

In Operation Example 2-2-5, both of the size of the new DCI format for the DL assignment and the size of the new DCI format for the UL grant are adjusted to match the size of the DCI format 0_1. In a case where the DCI format 0_1 is not configured and in a case where the size of the new DCI format is larger than the size of the DCI format 0_1 and is equal to or smaller than the size of the DCI format 1_1, the size of the new DCI format DCI for the DL assignment and the size of the new DCI format DCI for the UL grant may be adjusted to match the size of the format 1_1.

According to Operation Example 2-2-5, even in a case where a DL BWP is changed, size change for adjusting the size of the new DCI format for the UL grant to match the size of the DCI format 0_1 need not be performed in some cases.

Operation Example 2-3

In Operation Example 2-3, an example of Procedure B-4 illustrated in FIG. 8 is described. Non-limiting examples of Operation Example 2-3 include five Operation Examples 2-3-1 to 2-3-5. Which of Operation Examples 2-3-1 to 2-3-5 is applied may be decided in advance or may be decided by higher layer signaling.

Operation Example 2-3-1

In Operation Example 2-3-1, a size of the DCI format 0_1 (for UL grant) or the DCI format 1_1 (for DL assignment) is adjusted to match a size of one of the DCI format 0_1 (for UL grant) and the DCI format 1_1 (for DL assignment) that is larger than the DCI format 0_1 (for UL grant) or the DCI format 1_1 (for DL assignment) and has a smaller size.

Accordingly, size adjustment is performed for both of the DCI format 1_1 and the DCI format 0_1, and in a case where the size of the DCI format 1_1 and the size of the DCI format 0_1 are smaller than the one of the new DCI formats that has the smaller size, the size of the DCI format 1_1 and the size of the DCI format 0_1 become the same.

According to Operation Example 2-3-1, since the size of the DCI format 0_1 (for UL grant) or the DCI format 1_1 (for DL assignment) is adjusted to match the size of the one of the new DCI formats that has the smaller size, the number of padding bits can be reduced.

Operation Example 2-3-2

In Operation Example 2-3-2, the size of the new DCI format for the DL assignment is adjusted to match the size of the DCI format 1_1 (for DL assignment), and the size of the new DCI format for the UL grant is adjusted to match the size of the DCI format 0_1 (for UL grant). In a case where the DCI format 1_1 or the DCI format 0_1 is not configured, the size of the new DCI format may be adjusted to match a size of a DCI format that is configured.

According to Operation Example 2-3-2, sizes of DL control signals are adjusted to match each other, and sizes of UL control signals are adjusted to match each other, and therefore, even in a case where a UL BWP is changed, a DL control signal can be used continuously without a change in size. In other words, UE can continue blind detection concerning a DL control signal.

Operation Example 2-3-3

In Operation Example 2-3-3, both of the size of the DCI format 1_1 and the size of the DCI format 0_1 are adjusted to match the size of new DCI format for the DL assignment. In a case where the new DCI format for the DL assignment is not configured and in a case where the size of the DCI format 1_1 or the DCI format 0_1 is larger than the size of the new DCI format for the DL assignment and is equal to or smaller than the size of the DCI format for the UL grant, the sizes of the DCI format 1_1 and the DCI format 0_1 may be adjusted to match the size of the new DCI format for the UL grant.

According to Operation Example 2-3-3, even in a case where a UL BWP is changed, size change for adjusting the size of the DCI format 0_1 to match the size of the DCI for the DL assignment need not be performed in some cases.

Operation Example 2-3-4

In Operation Example 2-3-4, the size of the new DCI format for the DL assignment is adjusted to match the size of the DCI format 0_1 (for UL grant), and the size of the new DCI format for the UL grant is adjusted to match the size of the DCI format 1_1 (for DL assignment). In a case where the DCI format 1_1 or the DCI format 0_1 is not configured, the size of the new DCI format may be adjusted to match a size of a DCI format that is configured.

According to Operation Example 2-3-4, sizes of a DL control signal and a UL control signal are adjusted to match each other. In a case where the sizes of the control signal for DL and the control signal for UL are close to each other (for example, a difference in size is equal to or less than a threshold value), the number of padding bits can be reduced in some cases.

Operation Example 2-3-5

In Operation Example 2-3-3, both of the size of the DCI format 1_1 and the size of the DCI format 0_1 are adjusted to match the size of the new DCI format for the UL grant. In a case where the new DCI format for the UL grant is not configured and in a case where the size of the DCI format 1_1 or the DCI format 0_1 is larger than the size of the new DCI format for the UL grant and is equal to or smaller than the size of the DCI format for the DL assignment, the sizes of the DCI format 1_1 and the DCI format 0_1 may be adjusted to match the size of the new DCI format for the DL assignment.

According to Operation Example 2-3-5, even in a case where a DL BWP is changed, size change for adjusting the size of the DCI format 0_1 to match the size of the DCI for the UL grant need not be performed in some cases.

Operation Example 2-4

In Operation Example 2-4, an example of Procedure B-5 illustrated in FIG. 9 is described. Non-limiting examples of Operation Example 2-4 include five Operation Examples 2-4-1 to 2-4-5. Which of Operation Examples 2-4-1 to 2-4-5 is applied may be decided in advance or may be decided by higher layer signaling.

Operation Example 2-4-1

In Operation Example 2-4-1, a size of a new DCI format is adjusted to match a size of a DCI format having the largest size among the DCI format 0_0/1_0 for the CSS, the DCI format 0_0/1_0 for the USS, the DCI format 0_1, and the DCI format 1_1. Accordingly, in Operation Example 2-4-1, the size of the new DCI format is adjusted to match a size of a DCI format designated as having the same size by deleting a designated bit in a field of the new DCI format (truncation).

The designated bit to be deleted is, for example, a bit for frequency domain resource assignment. According to Operation Example 2-4-1, the size of the new DCI format is adjusted to match a DCI format having a larger size, and therefore the number of deleted bits can be reduced.

Operation Example 2-4-2

In Operation Example 2-4-2, the size of the new DCI format for the DL assignment is adjusted to match the size of the DCI format 1_1 (for DL assignment), and the size of the new DCI format for the UL grant is adjusted to match the size of the DCI format 0_1 (for UL grant). In a case where the DCI format 1_1 or the DCI format 0_1 is not configured, the size of the new DCI format may be adjusted to match a size of a DCI format that is configured. For example, the size of the new DCI format is adjusted by deleting a designated bit in a field of the new DCI format.

According to Operation Example 2-4-2, sizes of DL control signals are adjusted to match each other, and sizes of UL control signals are adjusted to match each other, and therefore, even in a case where a UL BWP is changed, a DL control signal can be used continuously without a change in size. In other words, UE can continue blind detection concerning a DL control signal.

Operation Example 2-4-3

In Operation Example 2-4-3, both of the size of the new DCI format for the DL assignment and the size of the new DCI format for the UL grant are adjusted to match the size of the DCI format 1_1. In a case where the DCI format 1_1 is not configured and in a case where the size of the new DCI format is larger than the size of the DCI format 1_1 and is equal to or smaller than the size of the DCI format 0_1, the size of the new DCI format may be adjusted to match the size of the DCI format 0_1. For example, the size of the new DCI format is adjusted by deleting a designated bit in a field of the new DCI format.

According to Operation Example 2-4-3, even in a case where a UL BWP is changed, size change for adjusting the size of the new DCI format for the UL grant to match the size of the DCI format 1_1 need not be performed in some cases.

Operation Example 2-4-4

In Operation Example 2-4-4, the size of the new DCI format for the DL assignment is adjusted to match the size of the DCI format 0_1 (for UL grant), and the size of the new DCI format for the UL grant is adjusted to match the size of the DCI format 1_1 (for DL assignment). In a case where the DCI format 1_1 or the DCI format 0_1 is not configured, the size of the new DCI format may be adjusted to match a size of a DCI format that is configured. For example, the size of the new DCI format is adjusted by deleting a designated bit in a field of the new DCI format.

According to Operation Example 2-4-4, sizes of a DL control signal and a UL control signal are aligned. In a case where the sizes of the control signal for DL and the control signal for UL are close to each other (for example, a difference in size is equal to or less than a threshold value), the number of padding bits can be reduced in some cases.

Operation Example 2-4-5

In Operation Example 2-4-5, both of the size of the new DCI format for the DL assignment and the new DCI format for the UL grant are adjusted to match the size of the DCI format 0_1. In a case where the DCI format 0_1 is not configured and in a case where the size of the new DCI format is larger than the size of the DCI format 0_1 and is equal to or smaller than the size of the DCI format 1_1, the size of the new DCI format may be adjusted to match the size of the DCI format 1_1. For example, the size of the new DCI format is adjusted by deleting a designated bit in a field of the new DCI format.

According to Operation Example 2-4-5, even in a case where a DL BWP is changed, size change for adjusting the size of the new DCI format for the DL assignment to match the size of the DCI format 0_1 need not be performed in some cases.

Operation Example 2-5

In Operation Example 2-5, DCI formats that are closest to each other in size among the following DCI format(s) are adjusted to have the same size.
  DCI format 0_0/1_0
  DCI format 0_1
  DCI format 1_1
  new DCI format for UL grant
  new DCI format for DL assignment In Step 2.3 (Procedure B) of Operation Example 1-2 and Step 2.3 (Procedure B) of Operation Example 1-3 according to Embodiment 1, in a case where the DCI format0_0/1_0 in the CSS and the DCI format 0_0/1_0 in the USS are different, DCI formats that are close to each other in size may be adjusted to have the same size while distinguishing sizes of the DCI format 0_0/1_0 in the CSS and the DCI format 0_0/1_0 in the USS.

In a case where a size of a DCI format is aligned with the size of the DCI format 0_0/1_0 in the CSS, the size of the DCI format is aligned with the size of the DCI format 0_0/1_0 in the CSS by deleting a bit of the DCI format. In other combinations, a size of a smaller DCI format is adjusted to match a size of a larger DCI format, and therefore a bit is added to the smaller DCI format.

According to Operation Example 2-5, the number of padding bits used for size adjustment and the number of bits deleted for size adjustment can be reduced.

Operation Example 2-6

In Operation Example 2-6, base station 100 notifies, by higher layer signaling, terminal 200 of information indicating with which of DCI format(s) a size of a new DCI format is aligned.

In a case where the size of the new DCI format is larger than a size of a DCI format designated as having the same size, terminal 200 may operate as follows:

- handle the case as an error case and do not perform detection of a new DCI format.
- adjust the size of the new DCI format to match the size of the DCI format designated as having the same size by deleting a designated bit such as a frequency assignment bit of the new DCI format (truncation).
- align the size of the DCI format designated as having the same size with the size of the new DCI format by adding a bit to the DCI format designated as having the same size.

Supplements to Overall Description

In a case where the size of the new DCI format for the DL assignment and the size of the new DCI format for the UL grant are equal, a bit (identification bit) for identifying the new DCI format for the DL assignment and the new DCI format for the UL grant may be added to one of or both of the new DCI format for DL the assignment and the new DCI format for the UL grant. Furthermore, even in a case where the new DCI format for the DL assignment and the new DCI format for the UL grant have different sizes, a bit (identification bit) for identifying the new DCI format for the DL assignment and the new DCI format for the UL grant may be added to one of or both of the new DCI format for the DL assignment and the new DCI format for the UL grant in advance. In a case where the identification bit is added in advance, identification using the identification bit is possible, for example, in relation to a DCI format that is assigned later even in a case where size adjustment is unnecessary.

Although a PDCCH signal has been described as an example of a control signal, the above embodiments may also be applied to control signals having other names. For example, the above embodiments may also be applied to signals of control channels having other names such as EPDCCH (enhanced PDCCH), R-PDCCH (relay-PDCCH), and MPDCCH (MTC PDCCH).

The PDCCH may be transmitted from the same carrier as the PDSCH called self carrier scheduling or may be transmitted from a carrier different from the PDSCH called cross carrier scheduling.

The "carrier" may be called "sub carrier" or "component carrier." One or more BWPs may be configured in one carrier for UE. The "carrier" is interchangeable with "cell" or "BWP."

The term "condition" is interchangeable with other terms such as "standard," "rule," "norm," or "method". Furthermore, the term "determine" is interchangeable with other terms such as "decide," "judge," "calculate," and "process."

Furthermore, the expression " . . . er(or)" used in the above embodiments may be replaced with other expressions such as " . . . circuitry," " . . . device," " . . . unit," or " . . . module."

Furthermore, terms such as "first" and "second" used in the present disclosure (including the claims and abstract) are used for convenience to distinguish two or more elements given these terms and do not limit the number of pieces (amount) of each element or an order of the elements. For example, reference to first and second elements does not mean that only these two elements can be employed and does not mean that the first element precedes the second element.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

<Summary of the Present Disclosure>

A base station according to the present disclosure includes: control circuitry, which, in operation, performs first processing for size alignment of control information between a first format for a first search space and a second format for a second search space and second processing for size alignment of the control information between a third format and the first format or the second format in a stepwise manner; and transmission circuitry, which, in operation, transmits the control information.

In the base station according to the present disclosure, the control circuitry may perform the first processing before the second processing.

In the base station according to the present disclosure, the control circuitry may perform the second processing before the first processing.

In the base station according to the present disclosure, after the first processing, the control circuitry may determine whether or not a condition that a total number of different control information sizes is not more than a predetermined value is met, and perform the second processing in a case where the condition that the total number of different control information sizes is not more than the predetermined value is not met.

In the base station according to the present disclosure, the control circuitry determines, before the second processing, whether or not a condition that a total number of different control information sizes is not more than a predetermined value is met, and performs the second processing in a case where the condition that the total number of different control information sizes is not more than the predetermined value is not met.

In the base station according to the present disclosure, in the second processing, the control circuitry may align a size of the control information with a size of the first format or the second format that is larger than a size of the third format.

In the base station according to the present disclosure, in the second processing, the control circuitry may align a size of the control information for downlink or for uplink with a size of one of the first format and the second format for downlink and for uplink that has a smaller size and is larger than a size of the third format.

A terminal according to the present disclosure includes: control circuitry, which, in operation, controls reception of control information based on information concerning application of first processing for size alignment of the control information between a first format and a second format and second processing for size alignment of the control information between a third format and the first format or the second format; and reception circuitry, which, in operation, receives the control information in accordance with the control.

A communication method for a base station, according to the present disclosure includes: performing first processing for size alignment of control information between a first format for a first search space and a second format for a second search space and second processing for size alignment of the control information between a third format and the first format or the second format in a stepwise manner; and transmitting the control information.

A communication method for a terminal, according to the present disclosure includes: controlling reception of control information based on information concerning application of first processing for size alignment of the control information between a first format for a first search space and a second format for a second search space and second processing for size alignment of the control information between a third format and the first format or the second format; and receiving the control information in accordance with the control.

INDUSTRIAL APPLICABILITY

The present disclosure is suitable, for example, for radio communication systems.

REFERENCE SIGNS LIST

100 Base station
101 DCI format decider
102 DCI format size adjuster
103 DCI generator
104 Error correction coder
105 Modulator
106 Signal assignor
107 Transmitter
108 Receiver
109 Signal separator
110 Demodulator
111 Error correction decoder
200 Terminal
201 Receiver
202 Signal separator
203 DCI receiver
204 Demodulator
205 Error correction decoder
206 DCI format configuration receiver
207 DCI format size adjuster
208 Error correction coder
209 Modulator
210 Signal assignor
211 Transmitter

The invention claimed is:

1. An integrated circuit for a communication apparatus, the integrated circuit comprising,
an input, which, in operation, inputs an electronic signal, and
controller circuitry, which, in operation, controls:
receiving one or more signals; and
monitoring, in the one or more signals, a plurality of downlink control information (DCI) formats including a DCI format 0_0, a DCI format 1_0, a first DCI format used for scheduling of physical uplink shared channel (PUSCH), and a second DCI format used for scheduling of physical downlink shared channel (PDSCH), wherein each of the first DCI format and the second DCI format is different from the following DCI formats:
DCI format 0_0;
DCI format 0_1;
DCI format 1_0;
DCI format 1_1;
DCI format 2_0;
DCI format 2_1; and
DCI format 2_2,
wherein the monitored plurality of DCI formats satisfy:
a first condition that a first total number of different DCI sizes of the plurality of the DCI formats is no more than a first determined number, and a second condition that a second total number of different DCI sizes with a cell-radio network temporary identifier (C-RNTI) of the plurality of the DCI formats is no more than a second determined number; or a third condition that a size of the DCI format 0_0 matches a size of the DCI format 1_0, and a fourth condition that a size of the first DCI format is based on a size of one of the plurality of DCI formats.

2. The integrated circuit according to claim 1, wherein the size of the first DCI format is adjusted based on the size of the second DCI format.

3. The integrated circuit according to claim 1, wherein the DCI format 0_0 and the DCI format 1_0 are monitored in a user equipment (UE) specific search space (USS).

4. The integrated circuit according to claim 1, wherein the first DCI format and the second DCI format are monitored in a user equipment (UE) specific search space (USS), and are not monitored in a common search space.

5. The integrated circuit according to claim 1, wherein the first DCI format and the second DCI format are newer than the following DCI formats:
DCI format 0_0;
DCI format 0_1;
DCI format 1_0;
DCI format 1_1;
DCI format 2_0;
DCI format 2_1; and
DCI format 2_2.

6. A communication apparatus comprising:
a receiver, which, in operation, receives one or more signals; and
circuitry, which is coupled to the receiver and which, in operation, monitors, in the one or more signals, a plurality of downlink control information (DCI) formats including a DCI format 0_0, a DCI format 1_0, a first DCI format used for scheduling of physical uplink shared channel (PUSCH), and a second DCI format used for scheduling of physical downlink shared channel (PDSCH), wherein each of the first DCI format and the second DCI format is different from the following DCI formats:
DCI format 0_0;
DCI format 0_1;
DCI format 1_0;
DCI format 1_1;
DCI format 2_0;
DCI format 2_1; and
DCI format 2_2,
wherein the plurality of DCI formats monitored by the circuitry satisfy:
a first condition that a first total number of different DCI sizes of the plurality of the DCI formats is no more than a first determined number, and a second condition that a second total number of different DCI sizes with a cell-radio network temporary identifier (C-RNTI) of the plurality of the DCI formats is no more than a second determined number; or
a third condition that a size of the DCI format 0_0 matches a size of the DCI format 1_0, and
a fourth condition that a size of the first DCI format is based on a size of one of the plurality of DCI formats.

7. The communication apparatus according to claim 6, wherein the size of the first DCI format is adjusted based on the size of the second DCI format.

8. The communication apparatus according to claim 6, wherein the DCI format 0_0 and the DCI format 1_0 are monitored in a user equipment (UE) specific search space (USS).

9. The communication apparatus according to claim 6, wherein the first DCI format and the second DCI format are monitored in a user equipment (UE) specific search space (USS), and are not monitored in a common search space.

10. The communication apparatus according to claim 6, wherein the first DCI format and the second DCI format are newer than the following DCI formats:
DCI format 0_0;
DCI format 0_1;
DCI format 1_0;
DCI format 1_1;
DCI format 2_0;
DCI format 2_1; and
DCI format 2_2.

11. A communication method comprising:
receiving one or more signals; and
monitoring, in the one or more signals, a plurality of downlink control information (DCI) formats including a DCI format 0_0, a DCI format 1_0, a first DCI format used for scheduling of physical uplink shared channel (PUSCH), and a second DCI format used for scheduling of physical downlink shared channel (PDSCH), wherein each of the first DCI format and the second DCI format is different from the following DCI formats:
DCI format 0_0;
DCI format 0_1;
DCI format 1_0;
DCI format 1_1;
DCI format 2_0;
DCI format 2_1; and
DCI format 2_2,
wherein the monitored plurality of DCI formats satisfy:
a first condition that a first total number of different DCI sizes of the plurality of the DCI formats is no more than a first determined number, and a second condition that a second total number of different DCI sizes with a cell-radio network temporary identifier (C-RNTI) of the plurality of the DCI formats is no more than a second determined number; or
a third condition that a size of the DCI format 0_0 matches a size of the DCI format 1_0; and
a fourth condition that a size of the first DCI format is based on a size of one of the plurality of DCI formats.

12. The communication method according to claim 11, wherein the size of the first DCI format is adjusted based on the size of the second DCI format.

13. The communication method according to claim 11, wherein the DCI format 0_0 and the DCI format 1_0 are monitored in a user equipment (UE) specific search space (USS).

14. The communication method according to claim 11, wherein the first DCI format and the second DCI format are monitored in a user equipment (UE) specific search space (USS), and are not monitored in a common search space.

15. The communication method according to claim 11, wherein the first DCI format and the second DCI format are newer than the following DCI formats:
DCI format 0_0;
DCI format 0_1;
DCI format 1_0;
DCI format 1_1;

DCI format 2_0;
DCI format 2_1; and
DCI format 2_2.

\* \* \* \* \*